United States Patent
Wariishi et al.

(10) Patent No.: US 6,670,475 B2
(45) Date of Patent: *Dec. 30, 2003

(54) INFORMATION RECORDING MEDIUM

(75) Inventors: Koji Wariishi, Kanagawa (JP); Toshio Ishida, Kanagawa (JP); Shinnichi Morishima, Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,310

(22) Filed: Sep. 30, 1997

(65) Prior Publication Data
US 2003/0078421 A1 Apr. 24, 2003

(30) Foreign Application Priority Data

Sep. 30, 1996 (JP) .............................. 8-276829
Feb. 28, 1997 (JP) .............................. 9-061779

(51) Int. Cl.$^7$ ........................ C07D 239/00; B32B 3/02
(52) U.S. Cl. .................. 544/242; 428/64.1; 428/64.4; 428/64.8
(58) Field of Search ................. 546/255, 256; 548/356.1, 366.1; 428/64.1, 64.4, 64.2; 430/270.2, 270.19, 270.16

(56) References Cited

U.S. PATENT DOCUMENTS

| | | | | |
|---|---|---|---|---|
| 3,502,474 A | * | 3/1970 | Momotoshi et al. | ............ 96/84 |
| 3,867,149 A | * | 2/1975 | Furuya et al. | ................ 96/101 |
| 4,497,888 A | * | 2/1985 | Nishioka et al. | ............ 430/165 |
| 5,879,772 A | * | 3/1999 | Morishima et al. | |
| 6,020,105 A | * | 2/2000 | Wariishi | ................ 430/270.2 |
| 6,203,876 B1 | * | 3/2001 | Morishima et al. | ........ 428/64.1 |

FOREIGN PATENT DOCUMENTS

JP 63209995 8/1988

OTHER PUBLICATIONS

Nishioka et al., (CA 101: 15059, abstract of DE 3322684).*
Furuya et al., (CA 80:42921, abstract of DE 2322275).*
Tsuda et al., CA 73:30645, abstract of U.S. patent 3502474).*
Furuya et al., (CA 75:8877, abstract of U.S. patent 3867149).*
Nishioka et al., (CA 85:7669, abstract of U.S. patent 4497888).*
Yamauchi et al., (CA 120:311306).*
Nishioka et al., (CA 101:15059, DE 3322684).*
Furuya et al., (CA 80:42921, DE 2322275).*
Tsuda et al., (73:30645, US 3502474).*
Furuya et al., (CA 75:8877, US 3867149).*
Nishioka et al., (CA 85:7669, US 4497888).*

* cited by examiner

Primary Examiner—Sabiha Qazi
(74) Attorney, Agent, or Firm—Sughrue Mion, PLLC

(57) ABSTRACT

An information recording medium showing a high light-resistance has a recording layer containing a dye compound having the following formula (IV-2):

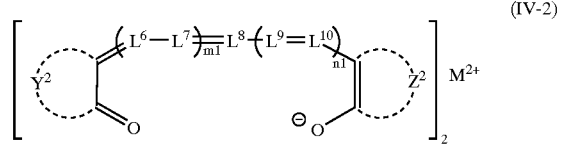

in which each of $Y^2$ and $Z^2$ is a group of atoms required for forming a carbon ring or a heterocyclic ring; each of $L^6$, $L^7$, $L^8$, $L^9$ and $L^{10}$ is a methine group which may have one or two substituents; $M^{2+}$ is an onium ion; and each of m1 and n1 is 0, 1 or 2.

3 Claims, No Drawings

INFORMATION RECORDING MEDIUM

FIELD OF THE INVENTION

This invention relates to an information recording medium on which information can be recorded by means of a laser beam having a high energy density, and a dye compound which is favorably utilized for preparing the information recording medium.

BACKGROUND OF THE INVENTION

The recordable compact disc (CD-R), on which information can be recorded only once, is widely used, for instance, as a large capacity computer data disc.

The optical disc of CD-R type generally comprises a disc-shaped substrate (support) and a recording layer provided thereon. The disc substrate comprises a transparent material such as synthetic resin. The recording layer comprises a metal or a semi-metal such as Bi, Sn, In or Te, or alternatively a dye such as a cyanine dye, a metal-complex dye, or a quinone dye. A light-reflecting layer and a protective layer may be superposed in order on the recording layer. The light-reflecting layer and the protective layer can be made of gold and resin, respectively.

On the CD-R, the writing (recording) and reading (reproducing) can be performed in the following manner. The laser beam (usually used wavelength is 780 nm) modulated by information is applied to the recording layer of the CD-R through the substrate. The recording layer alters its optical characteristics in the area where the laser beam has been applied, to produce a chemical or physical change such as production of pit. The reading of the recorded information can be performed by sequentially applying a laser beam on the recording layer of the CD-R through the substrate and detecting a light reflected on the CD-R.

At present, most of the recording layer of CD-R utilizes a light-sensitive dye as the recording material, because the recording dye layer can be easily formed by a coating method and shows a high sensitivity, as compared with the recording metal layer. However, the dye layer has such disadvantages as low light-resistance and low heat resistance. Therefore, it has been desired to develop a recording layer having high durability against light and heat, as well as having high recording and reproducing characteristics.

Japanese Patent Provisional Publication No. 63-209995 describes an optical disc which has a recording layer comprising an oxonol dye. According to the description of publication, such optical disc maintains stable recording and reproducing characteristics for a long time. The publication discloses an oxonol dye compound having an ammonium ion in the form of an inner salt.

The inventors have found that the optical disc having the recording layer of the above oxonol dye exhibits insufficient light-resistance, while the disc has relatively improved characteristics in view of heat resistance and durability for repeated reproducing. Therefore, such optical disc often causes troubles in reproducing process after long exposure to light such as sunlight.

Accordingly, it is an object of the present invention to provide an information recording medium having stable recording characteristics and particularly high light-resistance to maintain satisfactory recording characteristics for a long time.

It is another object of the present invention to provide a new oxonol dye compound favorably employable for preparing the information recording medium having stable recording characteristics.

SUMMARY OF THE INVENTION

The present invention resides in an information recording medium comprising a support and a recording layer provided thereon on which information can be recorded by means of a laser beam, wherein said recording layer contains a dye compound having the below-mentioned formula (I-1) or (I-2):

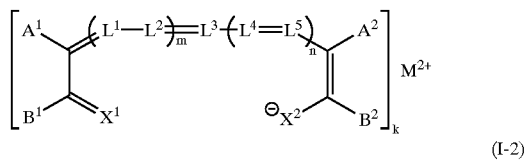

(I-1)

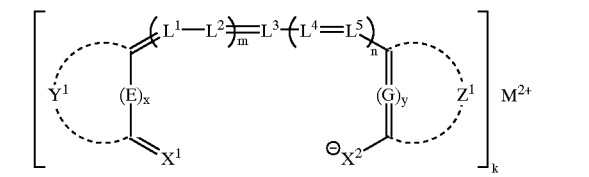

(I-2)

in which each of $A^1$, $A^2$, $B^1$ and $B^2$ independently represents a substituent group; each of $Y^1$ and $Z^1$ independently represents a group of atoms required for forming a carbon ring or a heterocyclic ring; each of E and G independently represents a group of atoms required for forming a conjugated double bond chain; $X^1$ represents =O, =NR or =C(CN)$_2$, wherein R is a substituent group; $X^2$ represents —O, —NR or —C(CN)$_2$, wherein R is a substituent-group; each of $L^1$, $L^2$, $L^3$, $L^4$ and $L^5$ independently represents a methine group which may have a substituent group; $M^{k+}$ represents an onium ion containing a positively charged onium atom to which no hydrogen atom is attached; each of m and n independently is an integer of 0, 1 or 2; each of x and y independently is an integer of 0 or 1; and k is an integer of 1 to 10.

The invention further resides in a new oxonol compound having the below-mentioned formula (IV-1) or (IV-2):

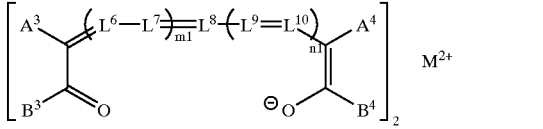

(IV-1)

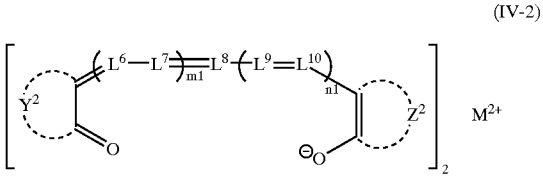

(IV-2)

in which each of $A^3$, $A^4$, $B^3$ and $B^4$ independently represents a substituent group selected from the group consisting of a linear, branched or cyclic alkyl group having 1 to 18 carbon atoms, an alkenyl group having 2 to 18 carbon atoms, an alkynyl group having 2 to 18 carbon atoms, an aryl group having 6 to 18 carbon atoms, an aralkyl group having 7 to 18 carbon atoms, an acyl group having 2 to 18 carbon atoms, an alkylsulfonyl group having 1 to 18 carbon atoms, an arylsulfonyl group having 6 to 18 carbon atoms, an alkylsulfinyl group having 1 to 18 carbon atoms, an alkoxycarbonyl group having 2 to 18 carbon atoms, an aryloxycarbonyl group having 7 to 18 carbon atoms; an alkoxy group having 1 to 18 carbon atoms, an aryloxy group having 6 to 18 carbon atoms, an alkylthio group having 1 to 18 carbon atoms, an arylthio group having 6 to 10 carbon atoms, an acyloxy group having 2 to 18 carbon atoms, a sulfonyloxy group, a carbamoyloxy group, an amino group, a carbamoyl group, a sulfamoyl group, a halogen atom, a hydroxyl group, a nitro group, a cyano group, a carboxyl group, and a 4- to 7-membered heterocyclic group, wherein these substituent groups may be substituted with at least one group selected from those consisting of the above-mentioned substituent groups;

each of $Y^2$ and $Z^2$ independently represents a group of atoms required for forming a 4- to 7-membered carbon ring or a 4- to 7-membered heterocyclic ring, which may be substituted with at least one group selected from those consisting of the substituent groups described for $A^3$, $A^4$, $B^3$ and $B^4$ and may be fused with a 4- to 7-membered carbon ring or a 4- to 7-membered heterocyclic ring;

each of $L^6$, $L^7$, $L^8$, $L^9$ and $L^{10}$ independently represents a methine group which may have one or two substituent groups selected from the group consisting of the substituent groups described for $A^3$, $A^4$, $B^3$ and $B^4$;

$M^{2+}$ represents a quaternary ammonium ion; and each of m1 and n1 independently represents an integer of 0, 1 or 2.

In contrast to the known oxonol dye compounds, the new oxonol dye compound of the invention comprises an onium salt in which an onium atom has no hydrogen atoms thereon (quaternary ammonium salt is particularly preferred). The inventors have found that the new oxonol dye compound enhances light-resistance to provide the information recording medium.

DETAILED DESCRIPTION OF THE INVENTION

The preferred embodiments of the invention are as follows:

(1) $M^{k+}$ in the formula (I-1) or (I-2) is a quaternary ammonium ion.
(2) k in the formula (I-1) or (I-2) is an integer of 0 to 4.
(3) k in the formula (I-1) or (I-2) is 2.
(4) $M^{k+}$ is an onium ion of the below-mentioned formula (II):

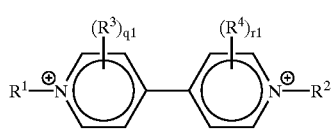

(II)

in which each of $R^1$ and $R^2$ independently represents a group selected from the group consisting of an alkyl group, an alkenyl group, an alkynyl group, an aryl group or a heterocyclic group; each of $R^3$ and $R^4$ independently represents a substituent group; or each set of $R^1$ and $R^3$, $R^2$ and $R^4$, or $R^3$ and $R^4$ can be combined to form a ring; each of q1 and r1 independently is an integer of 0 to 4; provided that plural $R^3$ and plural $R^4$ are the same as or different from each other in the case that q1 and r1 are 2 or more, respectively.

(5) $M^{k+}$ is an onium ion of the below-mentioned formula (III):

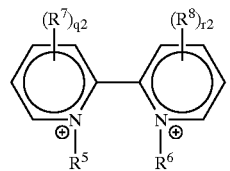

(III)

in which each of $R^5$ and $R^6$ independently represents a group selected from the group consisting of an alkyl group, an alkenyl group, an alkynyl group, an aryl group and a heterocyclic group; each of $R^7$ and $R^8$ independently represents a substituent group; or each set of $R^5$ and $R^6$, $R^5$ and $R^7$, $R^6$ and $R^8$, or $R^7$ and $R^8$ can be combined to form a ring; each of q2 and r2 independently is an integer of 0 to 4; provided that plural $R^7$ and plural $R^8$ are the same as or different from each other in the case that q2 and r2 are 2 or more, respectively.

(6) In the formula (I-1) or (I-2), each of m and n is 1; m is 0, while n is 2; or m is 2, while n is 2.
(7) In the formula (I-1) or (I-2), $X^1$ is =O and $X^2$ is —O.
(8) A light-reflecting layer is provided on the recording layer.
(9) A protective layer is provided on the light-reflecting layer.
(10) $M^{2+}$ in the formula (IV-1) or (IV-2) is an ion having the below-mentioned formula (V):

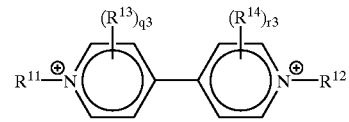

(V)

in which each of $R^{11}$ and $R^{12}$ independently represents a group selected from the group consisting of an alkyl group having 1 to 18 carbon atoms, an alkenyl group having 2 to 18 carbon atoms, an alkynyl group having 2 to 18 carbon atoms, and an aryl group having 6 to 18 carbon atoms, wherein the alkyl, alkenyl, alkynyl and aryl group may be substituted with one or more groups selected from the group consisting of the substituent groups described for $A^3$, $A^4$, $B^3$ and $B^4$ of the formulas (IV-1) or (IV-2); each of $R^{13}$ and $R^{14}$ independently represents a substituent group selected from the group consisting of the substituent groups described for $A^3$, $A^4$, $B^3$ and $B^4$ of the formulas (IV-1) or (IV-2); or each set of $R^{11}$ and $R^{13}$, $R^{12}$ and $R^{14}$, or $R^{13}$ and $R^{14}$ can be combined to form a 4- to 7-membered ring; each of q3 and r3 independently is an integer of 0 to 4; provided that plural $R^{13}$ and plural $R^{14}$ are the same as or different from each other in the case that q3 and r3 are 2 or more, respectively.

(11) $M^{2+}$ in the formula (IV-1) or (IV-2) is an ion having the below-mentioned formula (VI):

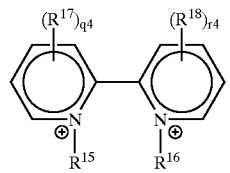

(VI)

in which each of $R^{15}$ and $R^{16}$ independently represents a group selected from the group consisting of an alkyl group having 1 to 18 carbon atoms, an alkenyl group having 2 to 18 carbon atoms, an alkynyl group having 2 to 18 carbon atoms, and an aryl group having 6 to 18 carbon atoms, wherein the alkyl, alkenyl, alkynyl and aryl group may be substituted with one or more groups selected from the group consisting of the substituent groups described for $A^3$, $A^4$, $B^3$ and $B^4$ of the formulas (IV-1) or (IV-2); each of $R^{17}$ and $R^{18}$ independently represents a substituent group selected from the group consisting of the substituent groups described for $A^3$, $A^4$, $B^3$ and $B^4$ of the formulas (IV-1) or (IV-2); or each set of $R^{15}$ and $R^{16}$, $R^{15}$ and $R^{17}$, $R^{16}$ and $R^{18}$, or $R^{17}$ and $R^{18}$ can be combined to form a 4- to 7-membered ring; each of q4 and r4 independently is an integer of 0 to 4; provided that plural $R^{17}$ and plural $R^{18}$ are the same as or different from each other in the case that q4 and r4 are 2 or more, respectively.

(12) In the formula (IV-1) or (IV-2), each of m1 and n1 is 1; m1 is 0, while n1 is 2; or m1 is 2, while n1 is 0.

(13) In the formula (IV-1) or (IV-2), each of the carbon ring and the heterocyclic ring for the group of atoms represented by $Y^2$ or $Z^2$ is pyrazolone ring, ring of thiobarbituric acid, ring of barbituric acid, indandione ring, or hydroxyphenalenone ring.

The information recording medium of the invention and the new oxonol compound are further described below.

The information recording medium of the invention is characterized by comprising the recording layer containing the oxonol dye compound having the aforementioned formula (I-1) or (I-2).

The oxonol dye compound of the invention is described below in more detail.

The oxonol dye compound favorably employable for the invention consists essentially of an anion part (dye component) and a cation part (onium component).

First, the anion part is described.

Examples of the substituent groups represented by $A^1$, $A^2$, $B^1$ and $B^2$ in the above formulas include following groups:

an alkyl group of 1–18 (preferably 1–8) carbon atoms which may have one or more substituent groups and which may form straight-chain or branched-chain or cyclic structure (e.g., methyl, ethyl, propyl, isopropyl, n-butyl, isobutyl, sec-butyl, t-butyl, cyclohexyl, methoxyethyl, ethoxycarbonylethyl, cyanoethyl, diethylaminoethyl, hydroxyethyl, chloroethyl, acetoxyethyl, and trifluoromethyl);

an aralkyl group of 7–18 (preferably 7–12) carbon atoms which may have one or more substituent groups (e.g., benzyl, and carboxybenzyl);

an alkenyl group of 2–18 (preferably 2–8) carbon atoms (e.g., vinyl);

an alkynyl group of 2–18 (preferably 2–8) carbon atoms (e.g., ethynyl);

an aryl group of 6–18 (preferably 6–10) carbon atoms which may have one or more substituent groups (e.g., phenyl, 4-methylphenyl, 4-methoxyphenyl, 4-carboxyphenyl, and 3,5-dicarboxyphenyl);

an acyl group of 2–18 (preferably 2–8) carbon atoms which may have one or more substituent groups (e.g., acetyl, propionyl, butanoyl, and chloroacetyl);

an alkylsulfonyl or arylsulfonyl group of 1–18 (preferably 1–8) carbon atoms which may have one or more substituent groups (e.g., methanesulfonyl and p-toluenesulfonyl);

an alkylsulfinyl group of 1–18 (preferably 1–8) carbon atoms (e.g., methanesulfinyl, ethanesulfinyl, and octanesulfinyl);

an alkoxycarbonyl group of 2–18 (preferably 2–8) carbon atoms (e.g., methoxycarbonyl, and ethoxycarbonyl);

an aryloxycarbonyl group of 7–18 (preferably 7–12) carbon atoms (e.g., phenoxycarbonyl, 4-methylphenoxycarbonyl, and 4-methoxyphenylcarbonyl);

an alkoxy group of 1–18 (preferably 1–8) carbon atoms which may have one or more substituent groups (e.g., methoxy, ethoxy, b-butoxy, and methoxyethoxy);

an aryloxy group of 6–18 (preferably 6–10) carbon atoms which may have one or more substituent groups (e.g., phenoxy and 4-methoxyphenoxy);

an alkylthio group of 1–18 (preferably 1–8) carbon atoms (e.g., methylthio and ethylthio);

an arylthio group of 6–10 carbon atoms (e.g., phenylthio);

an acyloxy group of 2–18 (preferably 2–8) carbon atoms which may have one or more substituent groups (e.g., acetoxy, ethylcarbonyloxy, cyclohexylcarbonyloxy, benzoyloxy, and chloroacetyloxy);

a sulfonyloxy group of 1–18 (preferably 1–8) carbon atoms which may have one or more substituent groups (e.g., methanesulfonyl);

a carbamoyloxy group of 2–18 (preferably 2–8) carbon atoms which may have one or more substituent groups (e.g., methylcarbamoyloxy and diethylcarbamoyloxy);

an amino group having 0–18 (preferably 0–8) carbon atoms which may have one or more substituent groups (e.g., non-substituted amino, methylamino, dimethylamino, diethylamino, anilino, methoxyphenylamino, chlorophenylamino, morpholino, piperidino, pyrrolidino, pyridylamino, methoxycarbonylamino, n-butoxycarbonylamino, phenoxycarbonylamino, methylcarbamoylamino, phenylcarbamoylamino, ethylthiocarbamoylamino, methylsufamoylamino, phenylsufamoylamino, acetylamino, ethylcarbonylamino, ethylthiocarbonylamino, cyclohexylcarbonylamino, benzoylamino, chloroacetylamino, methanesulfonylamino, and benzenesulfonylamino);

a carbamoyl group of 1–18 (preferably 1–8) carbon atoms which may have one or more substituent groups (e.g., non-substituted carbamoyl, methylcarbamoyl, ethylcarbamoyl, n-butylcarbamoyl, t-butylcarbamoyl, dimethylcarbamoyl, morpholinocarbamoyl, and pyrrolidinocarbamoyl);

a sulfamoyl group having 0–18 (preferably 0–8) carbon atoms which may have one or more substituent groups (e.g., non-substituted sulfamoyl, methylsulfamoyl, and phenylsulfamoyl);

a halogen atom (e.g., fluorine, chlorine, and bromine); hydroxyl group; nitro group; cyano group; carboxyl group; and a heterocyclic group (oxazole, benzoxazole, thiazole, benzothiazole, imidazole, benzoimidazole, indolenine, pyridine, sulfolane, furan, thiophene, pyrazol, pyrrole, chroman, and coumarin).

Each of the substituent groups represented by $A^1$ and $A^2$ preferably has Hammett's substituent constant ($\sigma_p$) of not less than 0.2. The values of Hammett's substituent constant ($\sigma_p$) are set forth in, for instance, Chem. Rev., 91, 165(1991). Examples of the particularly preferred substituent groups include cyano group, nitro group, alkoxycabonyl group, acyl group, carbamoyl group, sulfamoyl group, alkylsufonyl group, and arylsulfonyl group. Examples of the preferred substituent groups represented by $B^1$ and $B^2$ include alkyl group, aryl group, alkoxy group and amino group.

Each of the group of atoms [—C(=$L^1$)—(E)$_x$—C(=$X^1$)—] (hereinafter referred to as "W1") connecting to $Y^1$ and the group of atoms [—C(=$L^5$)—(G)$_y$—C(=$X^{2-}$)—] (hereinafter referred to as "W2") connecting to $Z^1$ forms a conjugated system, and therefore each of the carbon ring or heterocyclic ring constituting W1 and $Y^1$ and that of W2 and $Z^1$ has a resonating structure.

Each of the carbon ring or heterocyclic ring of W1 and $Y^1$ and that of W2 and $Z^1$ is preferably a 4- to 7-membered ring, more preferably a 5- or 6-membered ring. Each ring may form a condensed-ring with other 4- to 7-membered ring and may have substituent groups. Examples of the substituent groups are the same as those described hereinbefore for $A^1$, $A^2$, $B^1$ and B2. Examples of preferred hetero-atoms in the heterocyclic ring include B, N, O, S, Se and Te. Among them, N, O and S are particularly preferred.

Each of the numbers represented by x and y is independently 0 or 1, and preferably both of them are 0.

$X^1$ is $=$O, $=$NR or $=$C(CN)$_2$, and $X^2$ is —O, —NR or —C(CN)$_2$ in which R is a substituent group. Examples of the substituent group R are the same as those described hereinbefore for $A^1$, $A^2$, $B^1$ and $B^2$. Preferred substituent group R is an aryl group, and more preferably phenyl group. Preferred $X^1$ is $=$O and preferred $X^2$ is —O.

Examples of the carbon ring constituting the set of W1 and $Y^1$ or the set of W2 and $Z^1$ include following rings (in which each of Ra and Rb independently represents hydrogen atom or a substituent group):

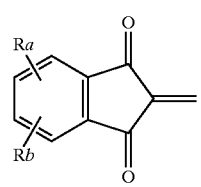
A-1

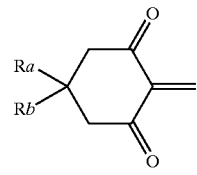
A-2

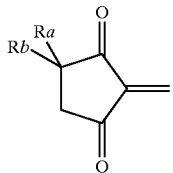
A-3

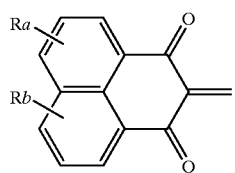
A-4

Among the above rings, A-1 and A-2 are preferred.

Examples of the heterocyclic rings consisting of the set of W1 and $Y^1$ or the set of W2 and $Z^1$ include following rings (in which each of Ra, Rb and Rc independently represents hydrogen atom or a substituent group):

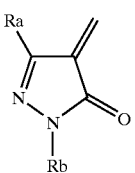
A-5

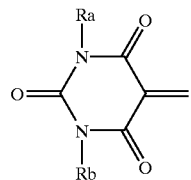
A-6

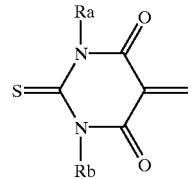
A-7

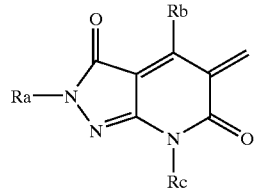
A-8

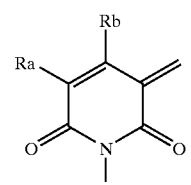
A-9

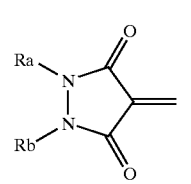
A-10

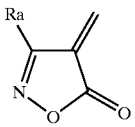
A-11

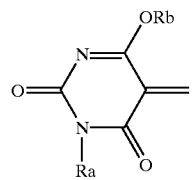
A-12

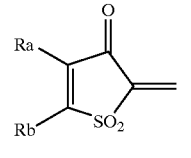
A-13

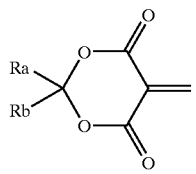
A-14

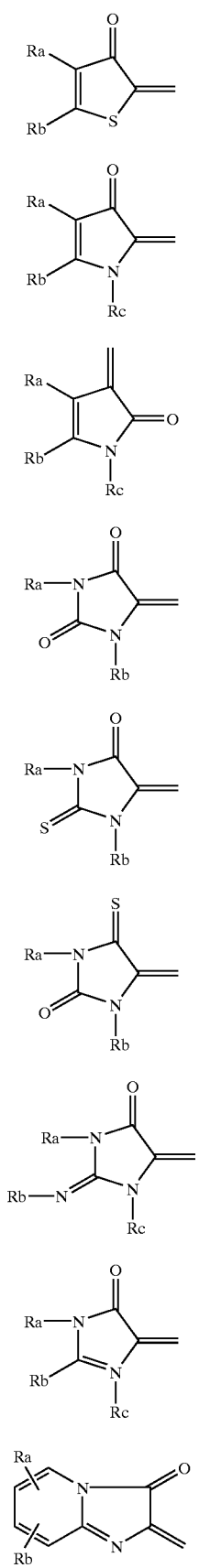
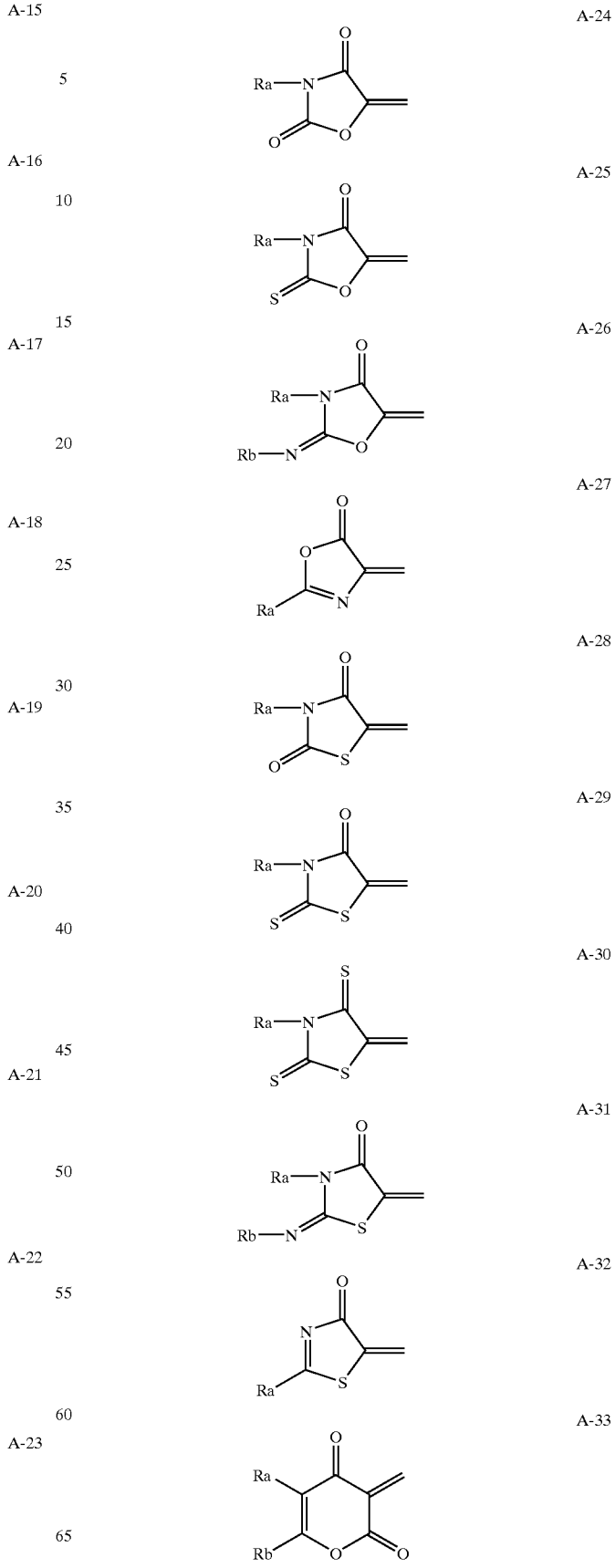

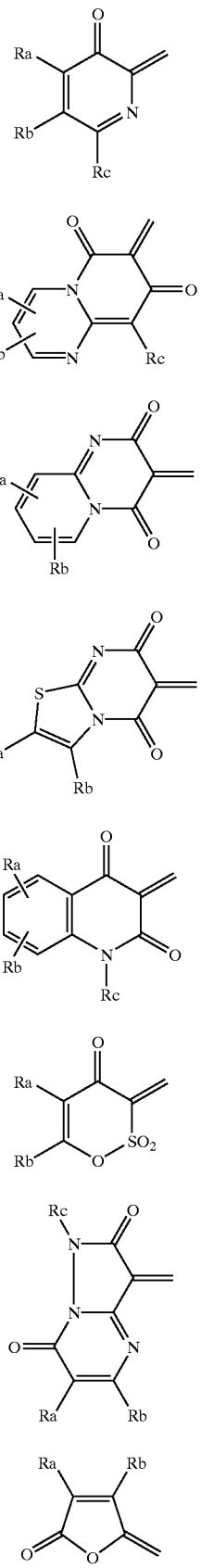
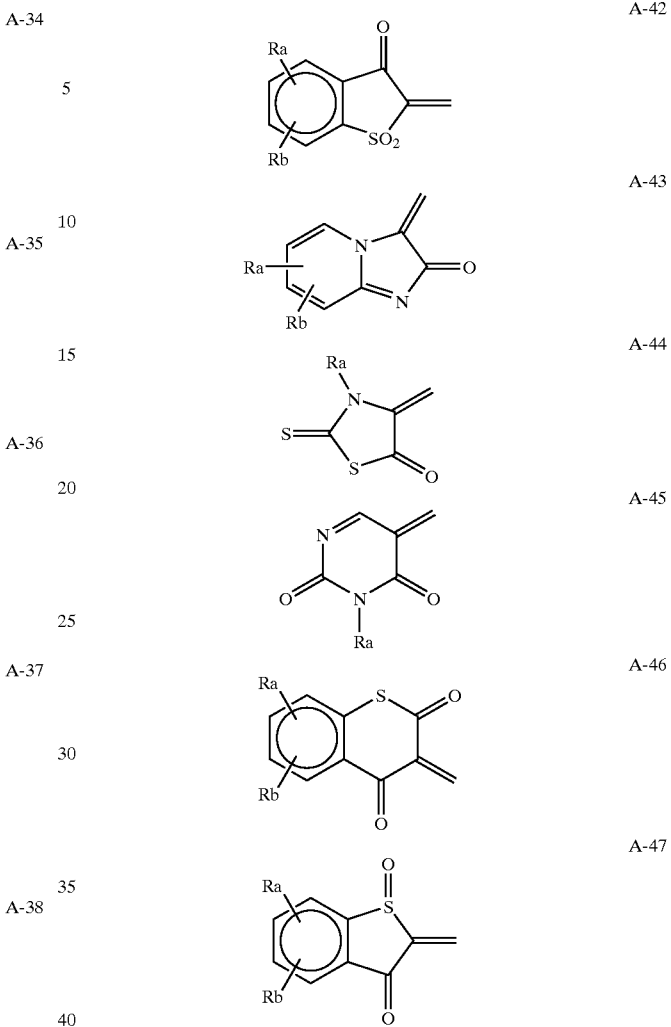

Among the above heterocyclic rings, A-5, A-6 and A-7 are preferred. Each of Ra, Rb and Rc has the same meaning as that described hereinbefore for $A^1$, $A^2$, $B^1$ and $B^2$. Ra, Rb and Rc may be combined to from a saturated or unsaturated carbon ring (e.g., cyclohexyl ring, cyclopentyl ring, cyclohexene ring, and benzene ring), or a saturated or unsaturated heterocyclic ring (e.g., piperidine ring, piperazine ring, morpholino ring, tetrahydrofuran ring, furan ring, thiophene ring, pyridine ring, and pyrazine ring). In that case, the ring may have one or more substituent groups. Examples of the substituent groups are the same as those described hereinbefore for $A^1$, $A^2$, $B^1$ and $B^2$.

Each of $L^1$, $L^2$, $L^3$, $L^4$ and $L^5$ independently represents a methine group which may have one or more substituent groups. Examples of the substituent groups are the same as those described hereinbefore for $A^1$, $A^2$, $B^1$ and $B^2$. Among them, preferred substituent groups are an alkyl group, an aralkyl group, an aryl group, alkoxy group, an aryloxy group, an alkylthio group, an arylthio group, a halogen atom, an amino group, a carbamoyl group and a heterocyclic group. The substituent groups may be combined to form a 5- to 7-membered ring (e.g., cyclopentene ring, 1-dimethylaminocyclopentene ring, 1-diphenylaminocyclopentene ring, cyclohexene ring, 1-chlorocyclohexene ring, isophorone ring, 1-morpholinocyclopentene ring and cycloheptene ring).

Preferred combinations of integers of m and n are m=1 and n=1; m=0 and n=2; and m=2 and n=0.

Next, the cation part is described in detail.

The onium ion represented by $M^{k+}$ comprises an onium atom which has positive charge and which has no hydrogen atoms thereon. Examples of the onium ions include a quaternary ammonium ion, oxonium ion, sulfonium ion, phosphonium ion, selenonium ion, and iodonium ion. Preferably, $M^{k+}$ is not a cyanine dye but a quaternary ammonium ion.

A quaternary ammonium can be obtained by alkylation (Menshutkin reaction), alkenylation, alkynylation or arylation of a tertiary amine (e.g., trimethylamine., triethylamine, tributylamine, triethanolamine, N-methyl-pyrrolidine, N,N-dimethylpiperazine, triethylenediamine, and N,N,N',N'-tetramethylethylenediamine) or a nitrogen-containing heterocyclic ring (pyridine, picoline, 2,2'-bipyridyl, 4,4'-bipyridyl, 1,10-phenanthroline, quinoline, oxazole, thizole, N-methylimidazole, pyrazine, and tetrazole).

$M^{k+}$ preferably is a quaternary ammonium ion comprising a nitrogen-containing heterocyclic ring, and more preferably a quaternary pyridinium ion.

k is an integer of 1 to 10, preferably 1 to 4. More preferably, k is 2.

The most preferred onium ions for $M^{k+}$ are ionic compounds having the below-mentioned formula (II) or (III):

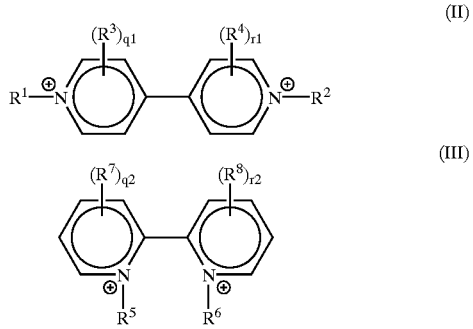

in which each of $R^1$, $R^2$, $R^5$ and $R^6$ independently represents an alkyl group, an alkenyl group, an alkynyl group, an aryl group or a heterocyclic group; each of $R^3$, $R^4$, $R^7$ and $R^8$ independently represents a substituent group (including substituent atom); or each set of $R^3$ and $R^4$, $R^5$ and $R^6$, $R^7$ and $R^8$, $R^1$ and $R^3$, $R^2$ and $R^4$, $R^5$ and $R^7$ or $R^6$ and $R^8$ can be combined to form a ring; each of q1, q2, r1 and r2 independently represents an integer of 0 to 4; under the condition that there can be different $R^3$, $R^4$, $R^7$ and $R^8$ in the case that q1, q2, r1 and r2 are 2 or more.

The above-mentioned onium ion for $M^{k+}$ can be obtained by Menshutkin reaction (described in, for instance, Japanese Patent Provisional Publication 61-148162) or arylation (described in, for instance, Japanese Patent Provisional Publications 51-16675 and H1-96171) of 2,2'-bipyridyl or 4,4'-bipyridyl with a halide having the desired substituent.

The alkyl group preferably used for $R^1$, $R^2$, $R^5$ and $R^6$ is an alkyl group of 1–18 carbon atoms which may have one or more substituent groups, and more preferably an alkyl group of 1–8 carbon atoms which may have one or more substituent groups. Examples of the alkyl groups include methyl, ethyl, n-propyl, isopropyl, n-butyl, isobutyl, n-hexyl, cyclohexyl and cyclopropyl.

Examples of substituent groups for the alkyl groups include:
a halogen atom (e.g., fluorine, chlorine, and bromine);
an alkoxy group of 1–18 (preferably 1–8) carbon atoms which may have one or more substituent groups (e.g., methoxy and ethoxy);

an aryloxy group of 6–10 carbon atoms which may have one or more substituent groups (e.g., phenoxy and p-methoxyphenoxy);
an alkylthio group of 1–18 (preferably 1–8) carbon atoms which may have one or more substituent groups (e.g., methylthio and ethylthio);
an arylthio group of 6–10 carbon atoms which may have one or more substituent groups (e.g., phenylthio);
an acyl group of 2–18 (preferably 2–8) carbon atoms which may have one or more substituent groups (e.g., acetyl and propionyl);
an alkylsulfonyl or arylsulfonyl group of 1–18 (preferably 1–8) carbon atoms which may have one or more substituent groups (e.g., methanesulfonyl and p-toluenesulfonyl);
an acyloxy group of 2–18 (preferably 2–8) carbon atoms which may have one or more substituent groups (e.g., acetoxy and propionyloxy);
an alkoxycarbonyl group of 2–18 (preferably 2–8) carbon atoms which may have one or more substituent groups (e.g., methoxycarbonyl and ethoxycarbonyl);
an alkenyl group of 2–18 (preferably 2–8) carbon atoms which may have one or more substituent groups (e.g., vinyl);
an alkynyl group of 2–18 (preferably 2–8) carbon atoms which may have one or more substituent groups (e.g., ethynyl);
an aryl group of 6–10 carbon atoms which may have one or more substituent groups (e.g., phenyl and naphthyl);
an aryloxycarbonyl group of 7–11 carbon atoms which may have one or more substituent groups (e.g., naphthoxycarbonyl);
an amino group having 0–18 (preferably 0–8) carbon atoms which may have one or more substituent groups (e.g., un-substituted amino, methylamino, dimethylamino, diethylamino, anilino, methoxyphenylamino, chlorophenylamino, morpholino, piperidino, pyrrolidino, pyridylamino, methoxycarbonylamino, n-butoxycarbonylamino, phenoxycarbonylamino, methylcarbamoylamino, ethylthiocarbamoylamino, phenylcarbamoylamino, acetylamino, ethylcarbonylamino, ethylthiocarbonylamino, cyclohexylcarbonylamino, benzoylamino, chloroacetylamino, and methylsulfonylamino);
a carbamoyl group of 1–18 (preferably 1–8) carbon atoms which may have one or more substituent groups (e.g., non-substituted carbamoyl, methylcarbamoyl, ethylcarbamoyl, n-butylcarbamoyl, t-butylcarbamoyl, dimethylcarbamoyl, morpholinocarbamoyl, and pyrrolidinocarbamoyl);
a sulfamoyl group having 0–18 (preferably 0–8) carbon atoms which may have one or more substituent groups (e.g., non-substituted sulfamoyl, methylsulfamoyl, and phenylsulfamoyl);
cyano group; nitro group; carboxyl group; hydroxyl group; and
a heterocyclic group (e.g., oxazole, benzoxazole, thiazole, benzothiazole, imidazole, benzoimidazole, indolenine, pyridine, sulfolane, furan, thiophene, pyrazol, pyrrole, chroman, and coumarin).

The alkenyl group for $R^1$, $R^2$, $R^5$ and $R^6$ preferably is an alkenyl group of 2–18 carbon atoms which may have one or more substituent groups, and more preferably an alkenyl group of 2–8 carbon atoms which may have one or more substituent groups. Examples of the alkenyl groups include vinyl, allyl, 1-propenyl and 1,3-butadienyl.

Examples of substituent groups for the alkenyl groups are the same as those described hereinbefore for alkyl group.

The alkynyl group for $R^1$, $R^2$, $R^5$ and $R^6$ preferably is an alkynyl group of 2–18 carbon atoms which may have one or more substituent groups, and more preferably an alkynyl group of 2–8 carbon atoms which may have one or more substituent groups. Examples of such alkynyl group include ethynyl and 2-propynyl.

Examples of substituent groups for the alkynyl groups are the same as those described hereinbefore for alkyl group.

The aryl group for $R^1$, $R^2$, $R^5$ and $R^6$ preferably is an aryl group of 6–18 carbon atoms which may have one or more substituent groups. Examples of such aryl group include phenyl and naphthyl.

Examples of substituent groups for the aryl groups are the same as those described hereinbefore for alkyl group. Alkyl groups (e.g., methyl and ethyl) are also preferably used as the substituent groups.

Examples of the heterocyclic groups preferably employable for $R^1$, $R^2$, $R^5$ and $R^6$ include oxazole, benzoxazole, thiazole, benzothiazole, imidazole, benzoimidazole, indolenine, pyridine, sulfolane, furan, thiophene, pyrazol, pyrrole, chroman and coumarin.

Each of $R^3$, $R^4$, $R^7$ and $R^8$ has the same meaning as that described hereinbefore for $A^1$, $A^2$, $B^1$ and $B^2$. Examples of the preferred substituent groups of $R^1$, $R^4$, $R^7$ and $R^8$ include a hydrogen atom and an alkyl group. Among them, a hydrogen atom is particularly preferred.

$R^5$ and $R^6$ are preferably combined to form a ring. In such case, the ring preferably has 5 to 7 members, more preferably 6 members. Each of a set of $R^3$ and $R^4$ and a set of $R^7$ and $R^8$ is preferably combined to form a carbon ring or a heterocyclic ring, more preferably a carbon ring. It is particularly preferred that each of the sets be combined with the connected pyridine ring to form a condensed aromatic ring.

In the oxonol compounds of the formulas (IV-1) and (IV-2), $A^3$, $A^4$, $B^3$ and $B^4$; $Y^2$ and $Z^2$; $L^6$, $L^7$, $L^8$, $L^9$ and $L^{10}$; and m1 and n1 have the same meaning as those of $A^1$, $A^2$, $B^1$ and $B^2$; $Y^1$ and $Z^1$; $L^1$, $L^2$, $L^3$, $L^4$ and $L^5$; and m and n in the formulas (IV-1) and (IV-2), respectively. Consequently, preferred examples of them are the same.

In $M^{2+}$ of the formulas (V) and (VI), $R^{11}$, $R^{12}$, $R^{13}$, $R^{14}$, $R^{15}$, $R^{16}$, $R^{17}$ and $R^{18}$; and q3, r3, q4 and r4 have the same meaning as those of $R^1$, $R^2$, $R^3$, $R^4$, $R^5$, $R^6$, $R^7$ and $R^8$; and q1, r1, q2 and r2 in the formulas (II) and (III), respectively. Consequently, preferred examples of them are the same.

Concrete examples of preferred anion parts of the dye compounds of the formulas (I-1) and (I-2) are given below.

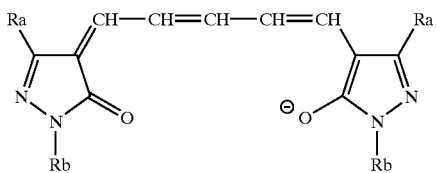

| No. | Ra | Rb |
|---|---|---|
| B-1 | COOEt | H |
| B-2 | COOEt | $CH_3$ |
| B-3 | COOEt | Ph |
| B-4 | COOEt | $CH_2CH_2OH$ |
| B-5 | $COOCH_3$ | Ph |
| B-6 | COOEt | 2,4,5-trichlorophenyl |
| B-7 | COOEt | $CONHC_4H_9(n)$ |
| B-8 | COOEt | CONHPh |
| B-9 | CN | Ph |
| B-10 | $COCH_3$ | Ph |
| B-11 | $CF_3$ | Ph |
| B-12 | $CONHCH_3$ | $CH_3$ |
| B-13 | $CONHCH_3$ | Ph |
| B-14 | $CONHC_4H_9(n)$ | Ph |
| B-15 | CONHPh | Ph |
| B-16 | $CONHCH_3$ | 2,4,5-trichlorophenyl |

-continued
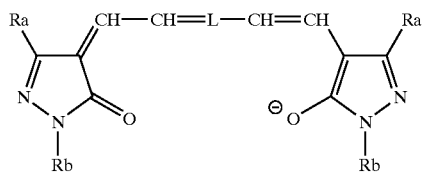
| No. | Ra | Rb | L |
|---|---|---|---|
| B-17 | CONHC₄H₉(n) | CONHC₄H₉(n) | CH |
| B-18 | Ph | H | CH |
| B-19 | Ph | CH₃ | CH |
| B-20 | Ph | Ph | CH |
| B-21 | Ph | 2,4,6-trichlorophenyl | CH |
| B-22 | 4-methoxyphenyl | Ph | CH |
| B-23 | 4-(NHCOCH₃)phenyl | Ph | CH |
| B-24 | 3-methylphenyl | Ph | CH |
| B-25 | Ph | 2,4,6-trichlorophenyl | C(CH₃) |
| B-26 | Ph | CONHC₄H₉(n) | CH |
| B-27 | Ph | 2,3-dimethylphenyl | CH |
| B-28 | COOEt | CH₂Ph | CH |
| B-29 | SO₂CH₃ | Ph | CH |
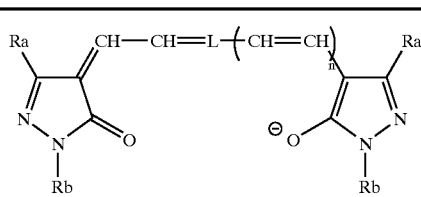
| No. | Ra | Rb | L | n |
|---|---|---|---|---|
| B-30 | CH₃SO₂NH | Ph | CH | 1 |
| B-31 | HO | Ph | C(CONH₂) | 1 |
| B-32 | CH₃ | Ph | C(Ph) | 1 |
| B-33 | CH₃ | Ph | C(CH₂Ph) | 1 |

-continued
| No. | | | | |
|---|---|---|---|---|
| B-34 | CH₃ | Ph | 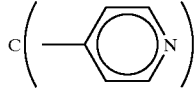 | 1 |
| B-35 | EtO | Ph | CH | 1 |
| B-36 | NHCOCH₃ | Ph | CH | 1 |
| B-37 | NHCOPh | Ph | CH | 1 |
| B-38 | NHCOPh | CONHC₄H₉(n) | CH | 1 |
| B-39 | NHCOPh | CONHPh | CH | 1 |
| B-40 | COOEt | 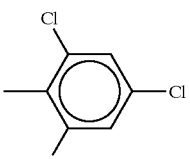 | CH | 0 |
| B-41 | CN | 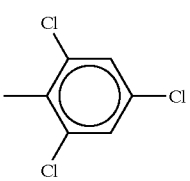 | CH | 0 |
| B-42 | CF₃ | Ph | CH | 0 |
| B-43 | CONHC₄H₉(n) | Ph | CH | 0 |
| B-44 | NHCOC₄H₉(n) | Ph | CH | 0 |
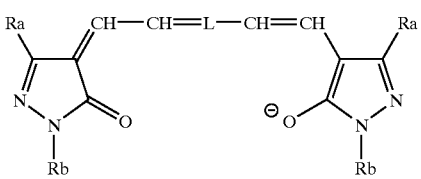
| No. | Ra | Rb | L |
|---|---|---|---|
| B-45 | 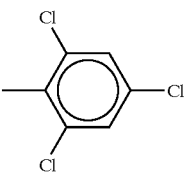 | 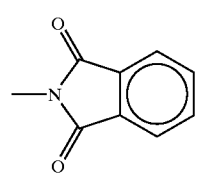 | CH |
| B-46 | NH₂ | Ph | CH |
| B-47 | NHCONHC₄H₉(n) | Ph | CH |
| B-48 | NHCOOC₄H₉(n) | Ph | CH |
| B-49 | (3,5-dichlorophenyl) | CH₂Ph | CH |
| B-50 | NHCOPh | Ph | C(Ph) |
| B-51 | (phthalimido) | Ph | CH |

-continued

| No. | Ra | Rb | L |
|---|---|---|---|
| B-52 | (N-phthalimidyl) | 2,4,6-trichlorophenyl | CH |
| B-53 | CN | 2,4,6-trichlorophenyl | CH |
| B-54 | CF₃ | 2,4,6-trichlorophenyl | CH |

| No. | Ra | Rb | L |
|---|---|---|---|
| B-55 | COOEt | 2,4,6-trichlorophenyl | C(CH₃) |
| B-56 | CN | 2,4,6-trichlorophenyl | C(CH₃) |
| B-57 | CF₃ | 2,4,6-trichlorophenyl | C(CH₃) |
| B-58 | COCH₃ | 2,4,6-trichlorophenyl | C(CH₃) |

-continued
| No. | | | | |
|---|---|---|---|---|
| B-59 | COOEt | 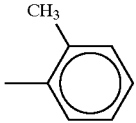 | | C(CH$_3$) |
| B-60 | CN | 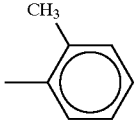 | | C(CH$_3$) |
| B-61 | COOEt | 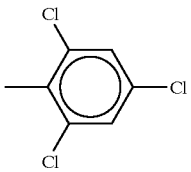 | | C(Br) |
| B-62 | COOEt | 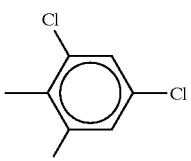 | | C(Cl) |
| B-63 | CN | 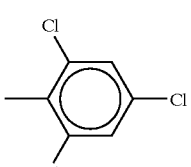 | | C(Br) |
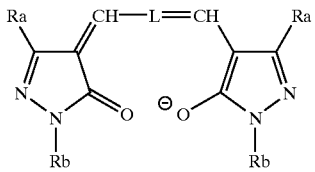
| No. | Ra | Rb | L |
|---|---|---|---|
| B-64 | CN | Ph | C(Br) |
| B-65 | COOEt | Ph | C(Cl) |
| B-66 | COOEt | Ph | CH |
| B-67 | CONHCH$_3$ | Ph | CH |
| B-68 | NHCOCH$_3$ | Ph | CH |
| B-69 | CH$_3$ | Ph | CH |
| B-70 | NH$_2$ | Ph | CH |
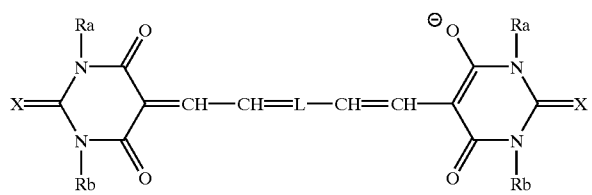
| No. | Ra | Rb | X | L |
|---|---|---|---|---|
| B-71 | H | H | O | CH |
| B-72 | H | CH$_3$ | O | CH |
| B-73 | H | n-C$_4$H$_9$ | O | CH |
| B-74 | n-C$_4$H$_9$ | n-C$_4$H$_9$ | O | CH |
| B-75 | H | Ph | O | CH |
| B-76 | H | Ph | O | C(Ph) |
| B-77 | Ph | Ph | O | CH |

-continued
| | | | | |
|---|---|---|---|---|
| B-78 | H | 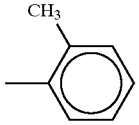 | O | CH |
| B-79 | H | 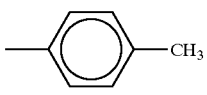 | O | CH |
| B-80 | H | H | S | CH |
| B-81 | H | $C_2H_5$ | S | CH |
| B-82 | $C_2H_5$ | $C_2H_5$ | S | CH |
| B-83 | H | $n\text{-}C_4H_9$ | O | $C(CH_2Ph)$ |
| B-84 | H | Ph | O | $C(CH_3)$ |
| B-85 | H | Ph | S | CH |
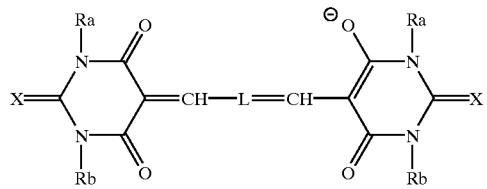
| No. | Ra | Rb | X | L |
|---|---|---|---|---|
| B-86 | H | $n\text{-}C_4H_9$ | O | CH |
| B-87 | H | Ph | O | CH |
| B-88 | $CH_3$ | $CH_3$ | O | CH |
| B-89 | Ph | Ph | O | CH |
| B-90 | H | Ph | O | $C(CH_3)$ |
| B-91 | H | 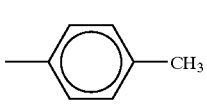 | O | $C(CH_2Ph)$ |
| B-92 | H | $n\text{-}C_4H_9$ | S | CH |
| B-93 | H | Ph | S | CH |
| B-94 | Ph | Ph | S | CH |
| B-95 | Et | Et | S | CH |
| B-96 | H | Ph | S | $C(CH_3)$ |
B-97
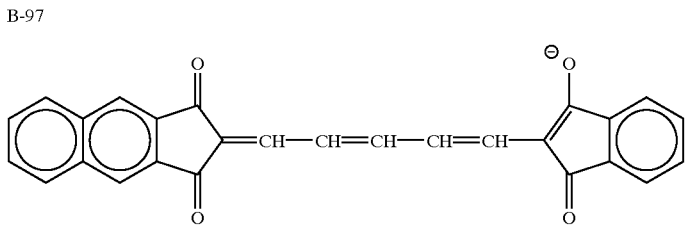
B-98
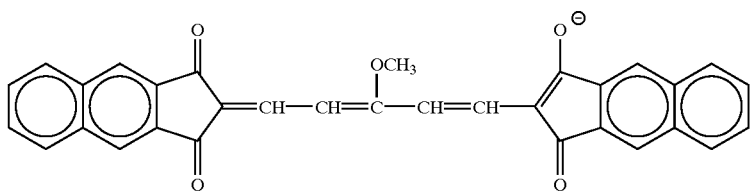

-continued
B-99
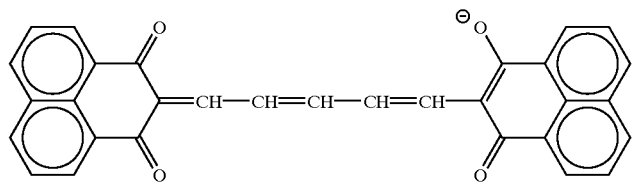
B-100
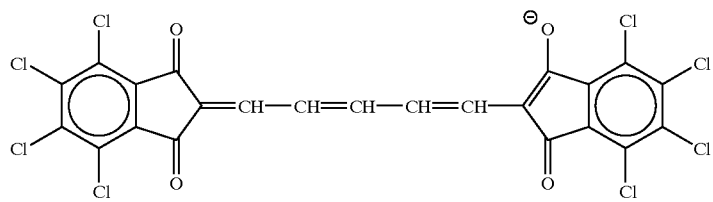
B-101
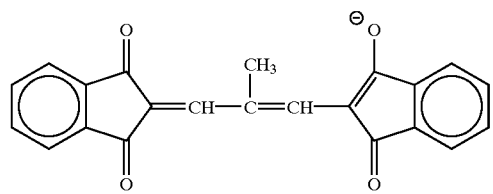
B-102
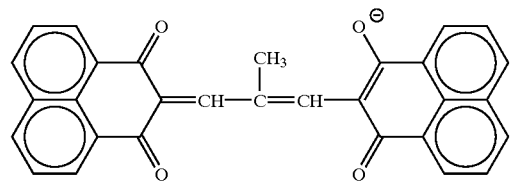
B-103
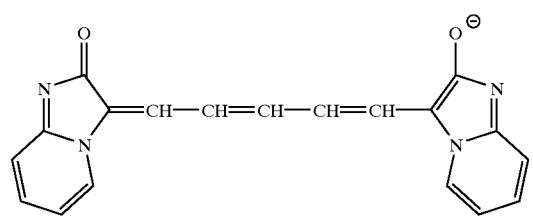
B-104
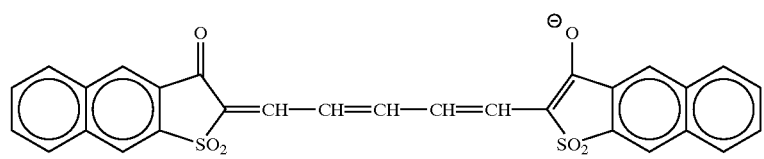
B-105
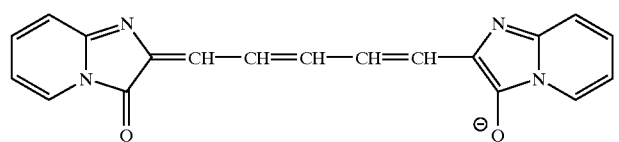

B-106
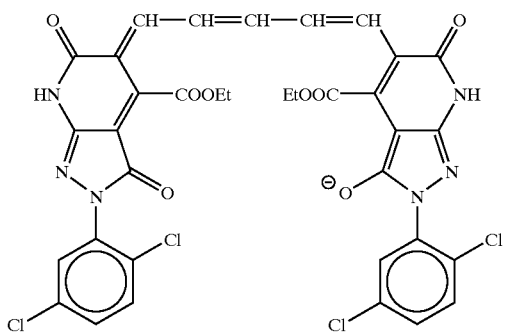
B-107
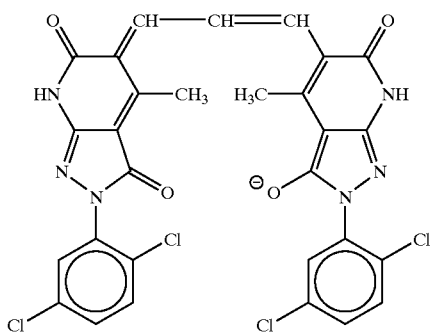
B-108
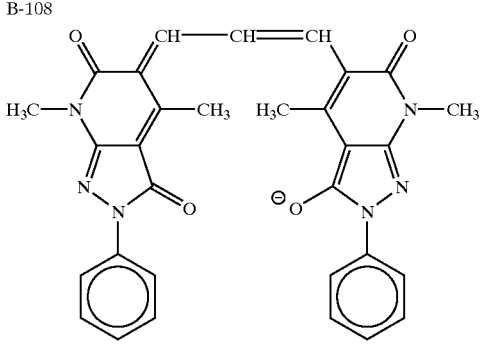
B-109
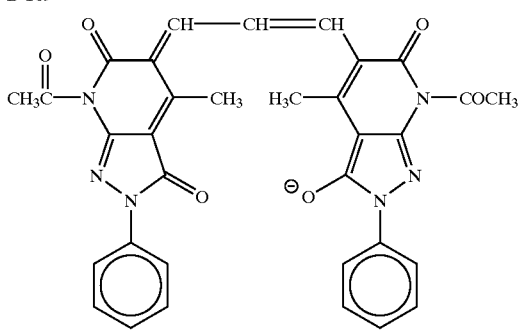
B-110
B-111
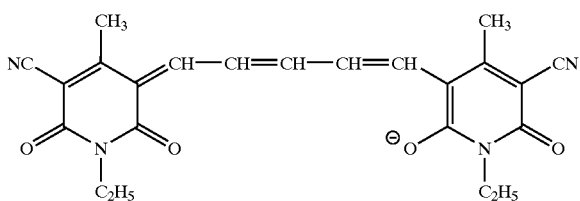
B-112
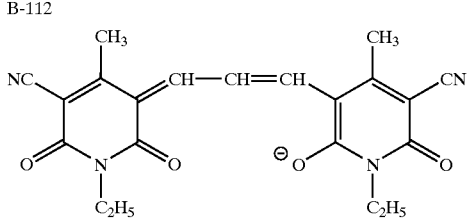

-continued
B-113
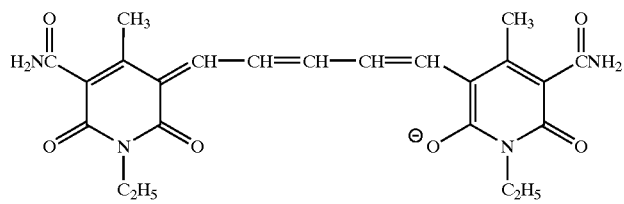
B-114
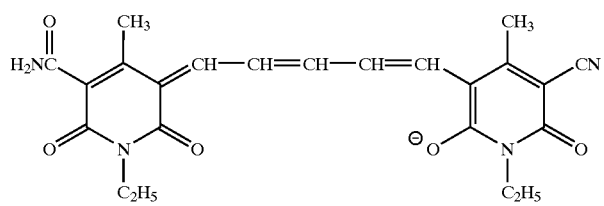
B-115
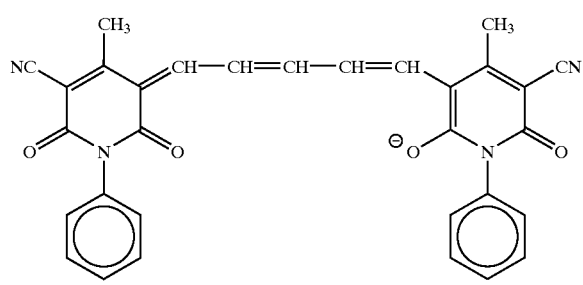
B-116
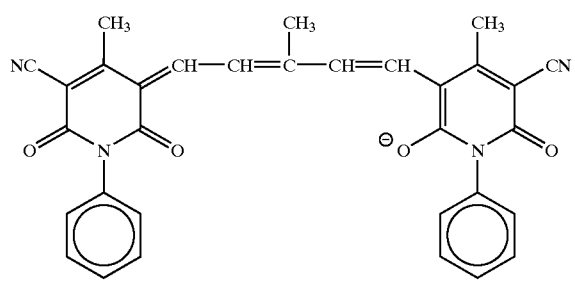
B-117
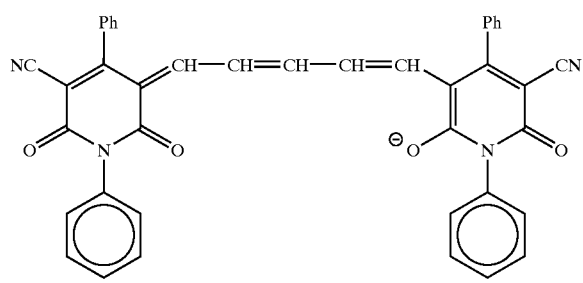

B-118
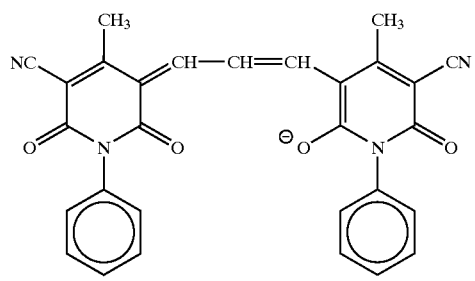
B-119
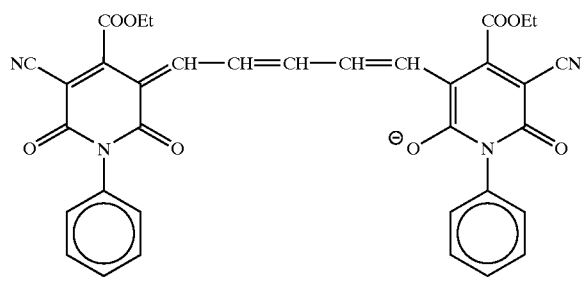
B-120
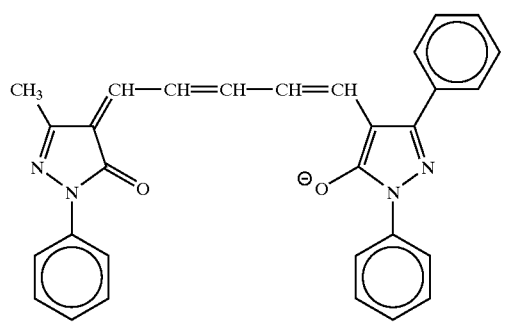
B-121
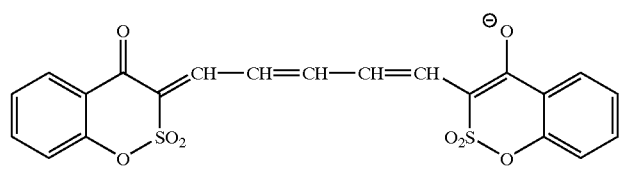
B-122
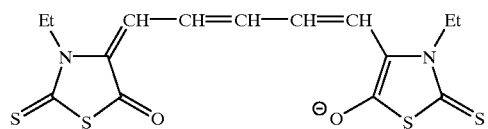
B-123
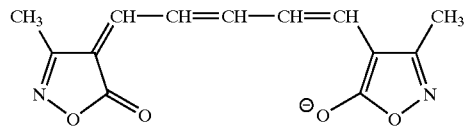

-continued
B-124
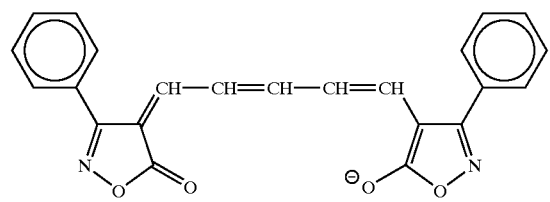
B-125
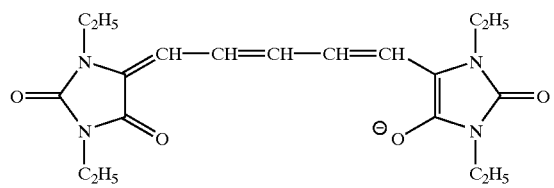
B-126
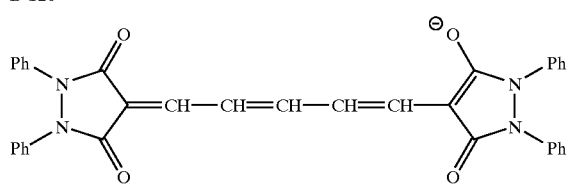
B-127
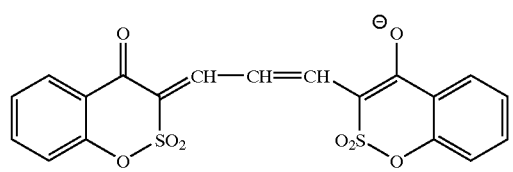
B-128
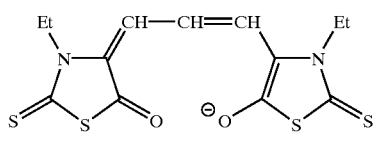
B-129
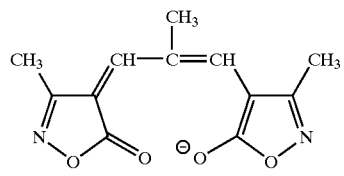
B-130
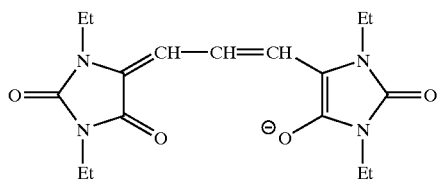
B-131
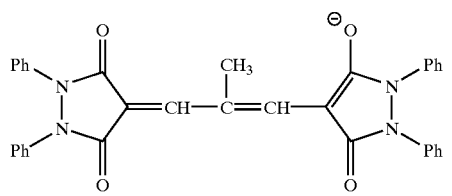
B-132
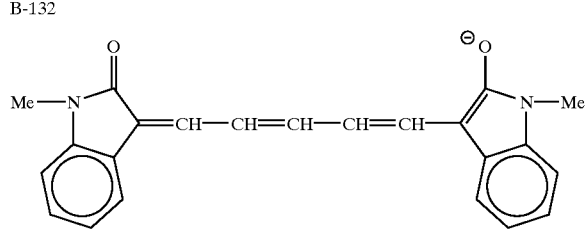

-continued
B-133
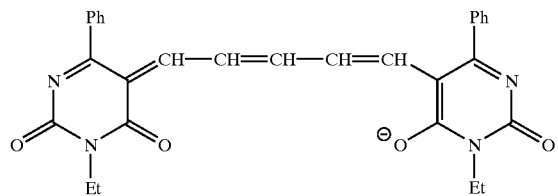
B-134
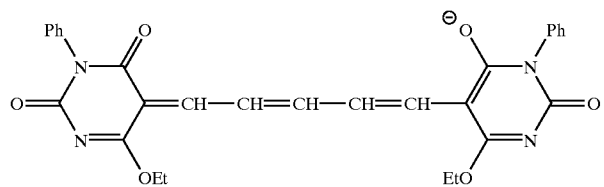
B-135
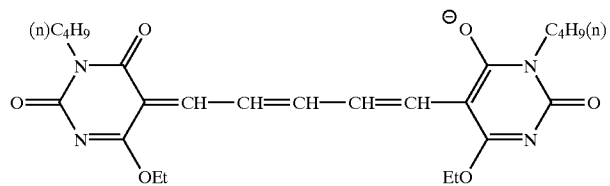
B-136
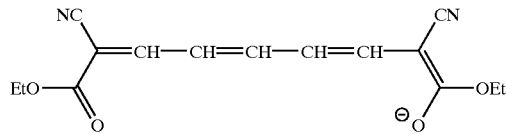
B-137
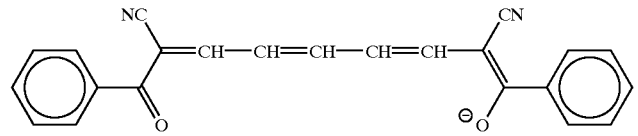
B-138
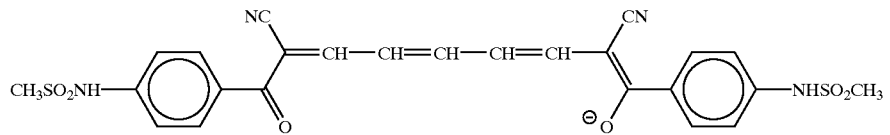
B-139
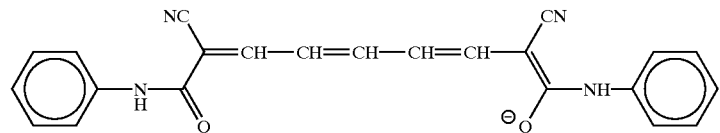
B-140
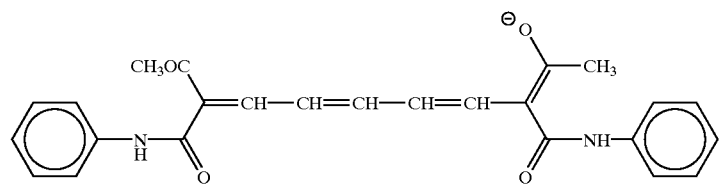

B-141
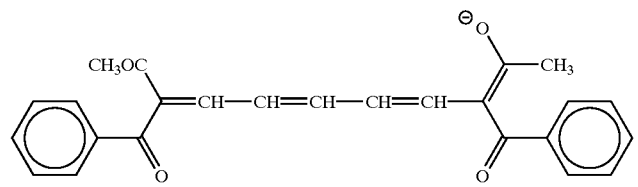
B-142
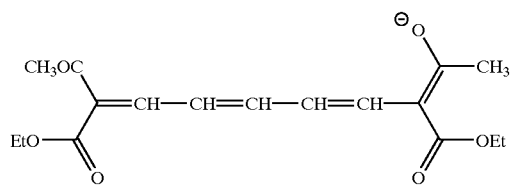
B-143
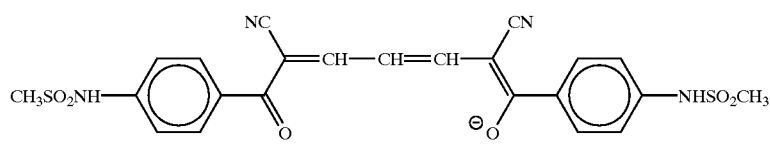
B-144
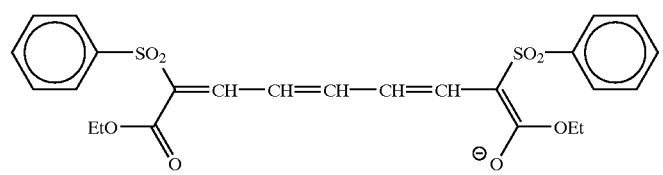
B-145
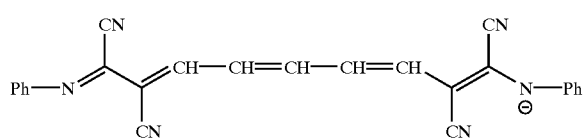
B-146
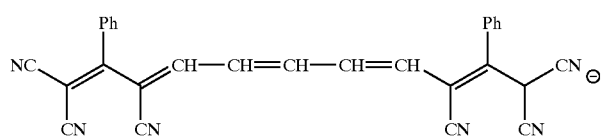
B-147
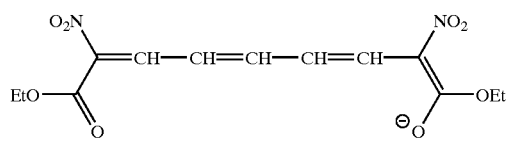
B-148
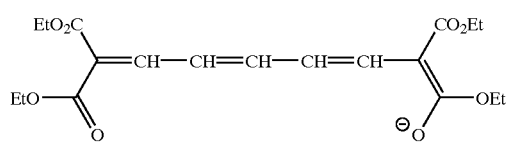

-continued
B-149
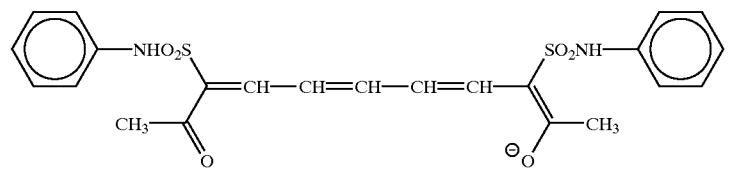
B-150
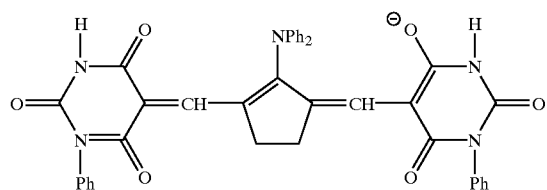
B-151
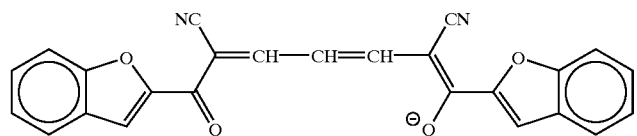
B-152
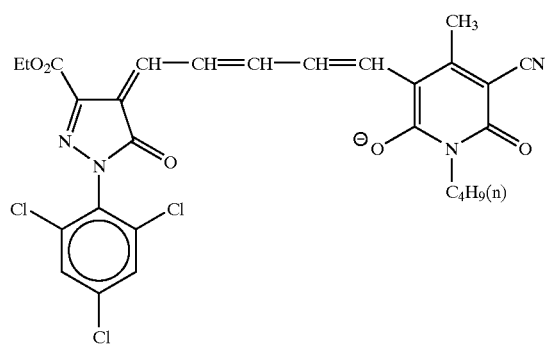
B-153
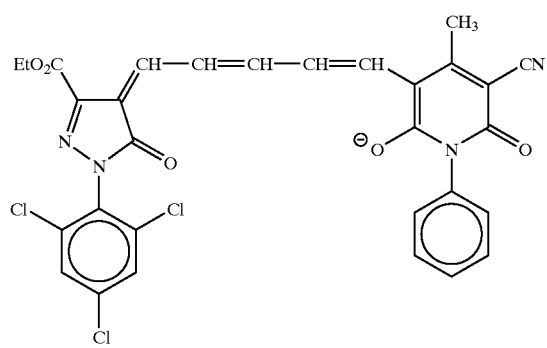

-continued
B-154
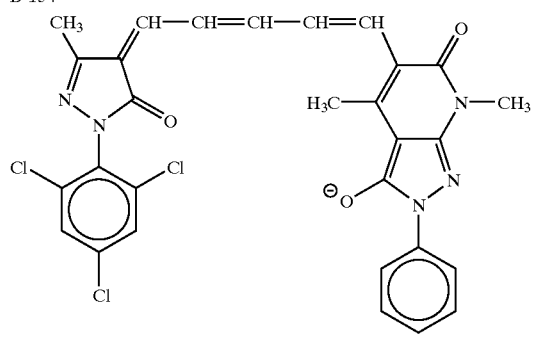
B-155
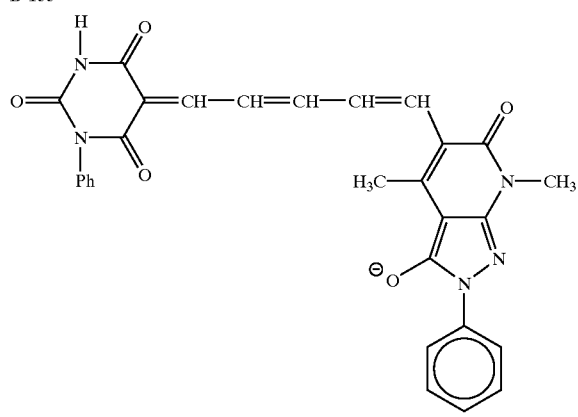
B-156
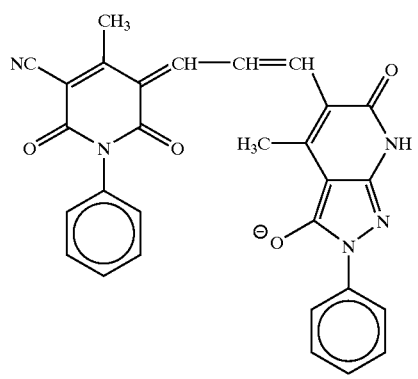
B-157
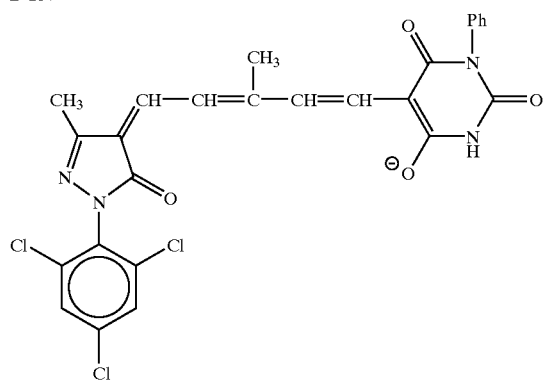

-continued
B-158
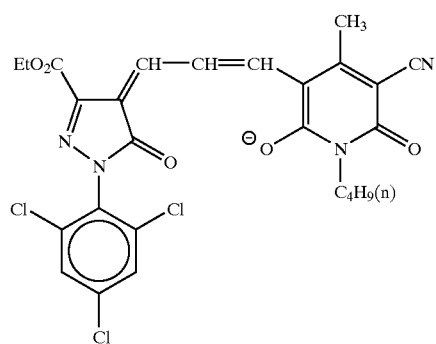
B-159
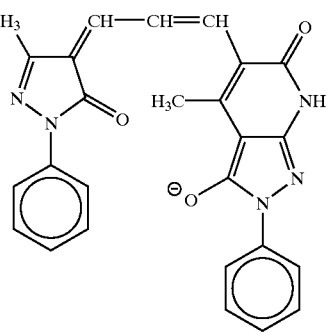
B-160
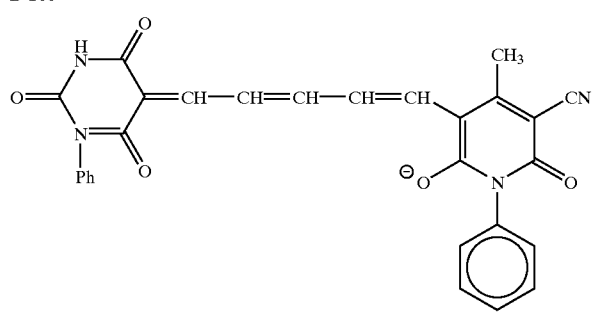
B-161
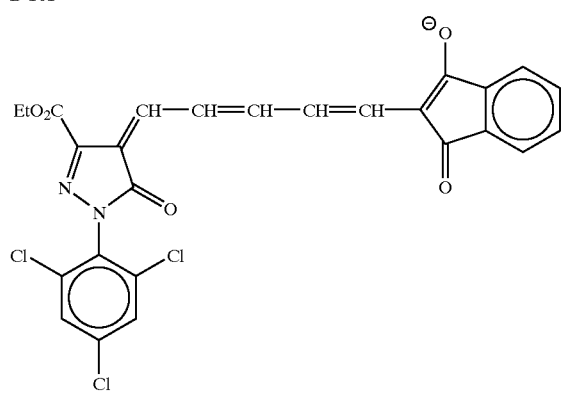
B-162
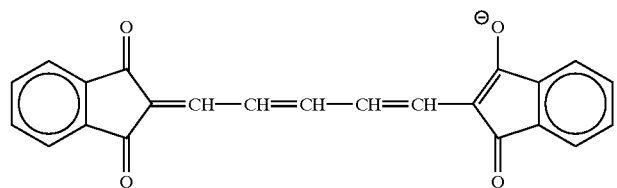
B-163
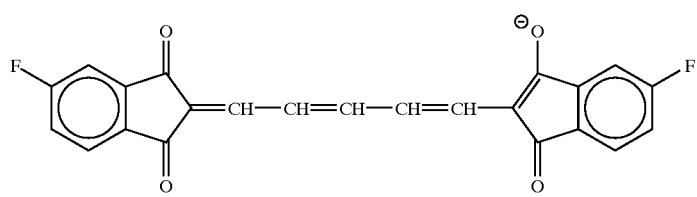

-continued
B-164
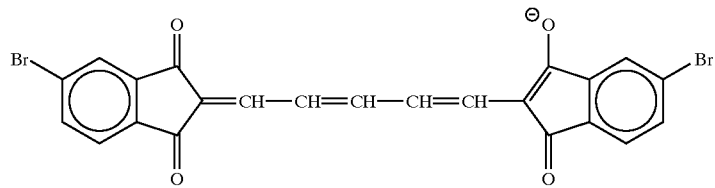
B-165
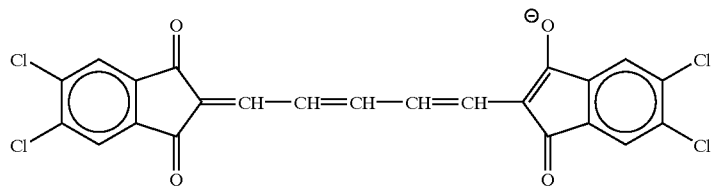
B-166
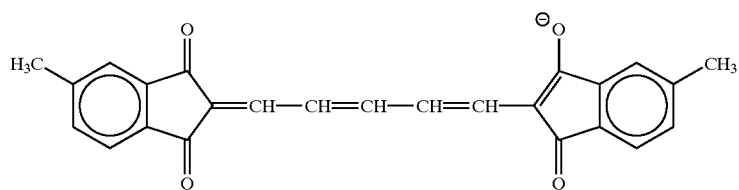
B-167
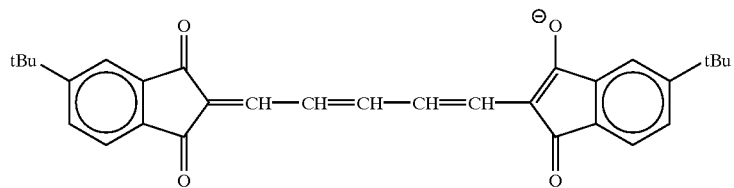
B-168
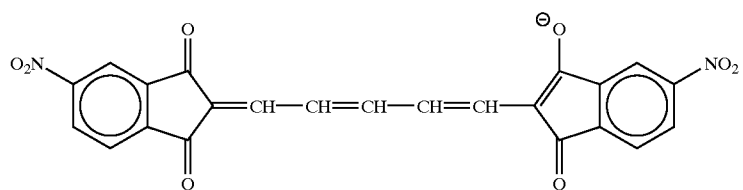
B-169
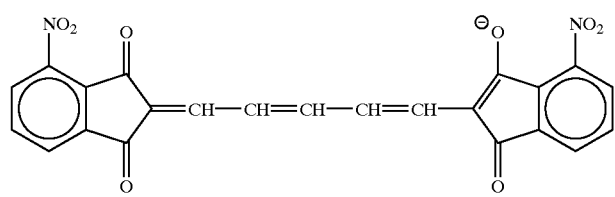
B-170
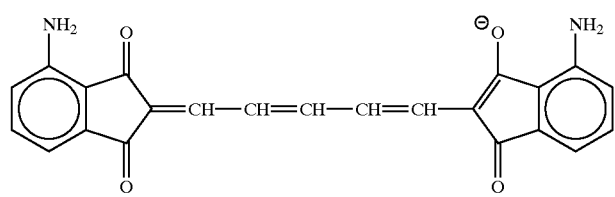

B-171
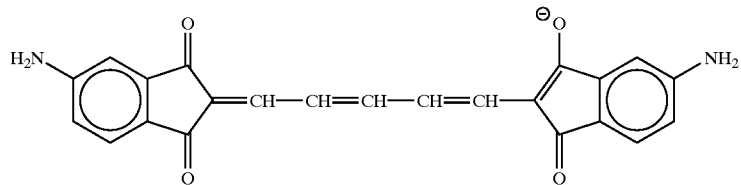
B-172
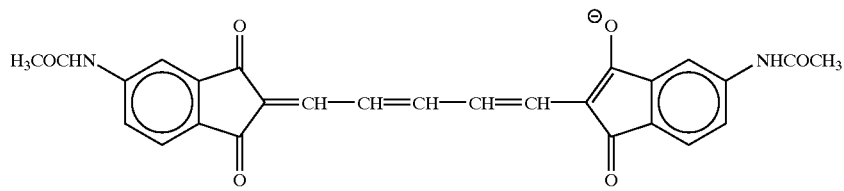
B-173
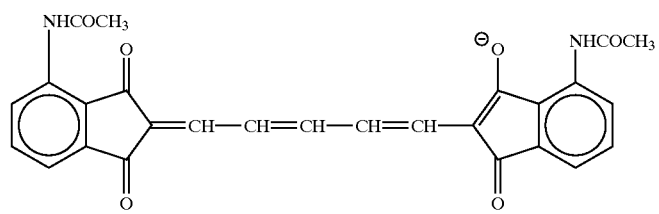
B-174
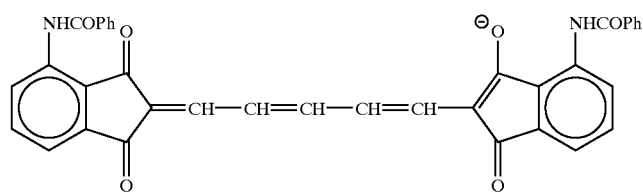
B-175
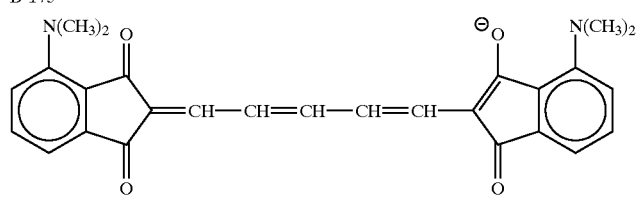
B-176
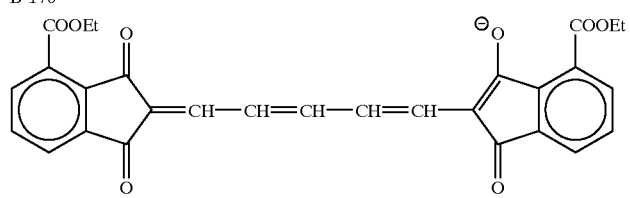
B-177
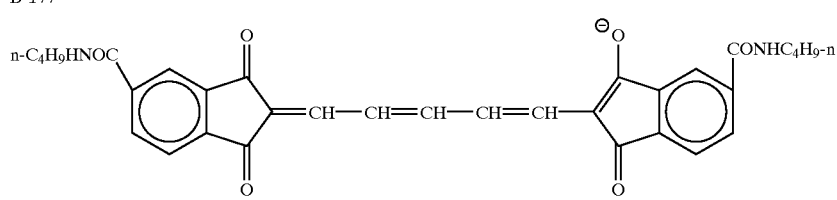

-continued
B-178
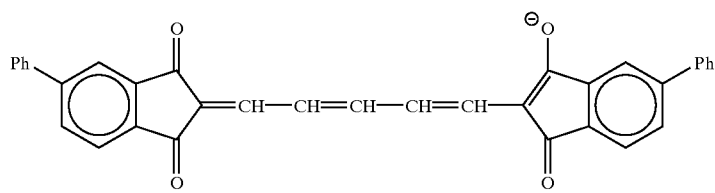
B-179
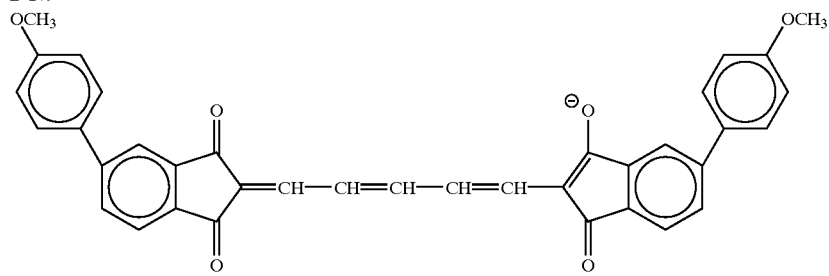
B-180
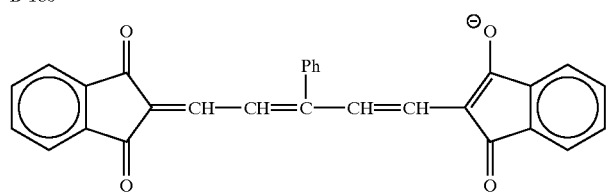
B-181
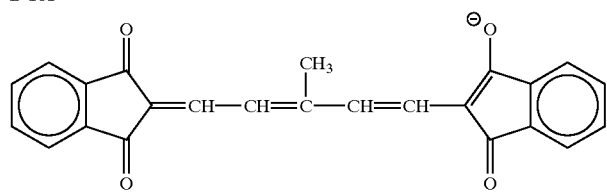
B-182
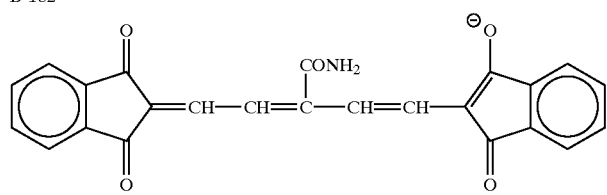
B-183
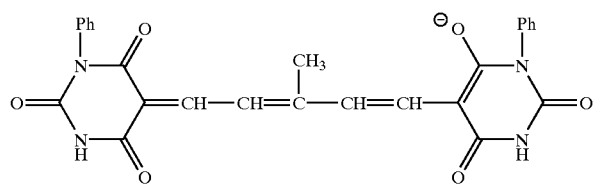
B-184
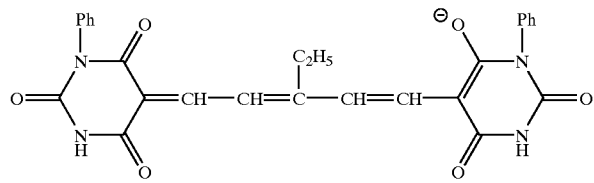

-continued
B-185
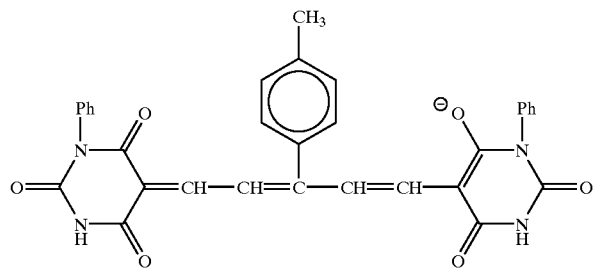
B-186
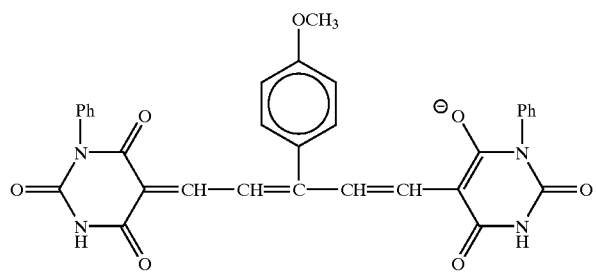
B-187
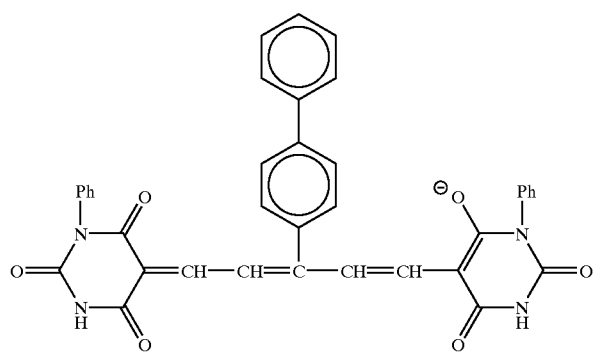
B-188
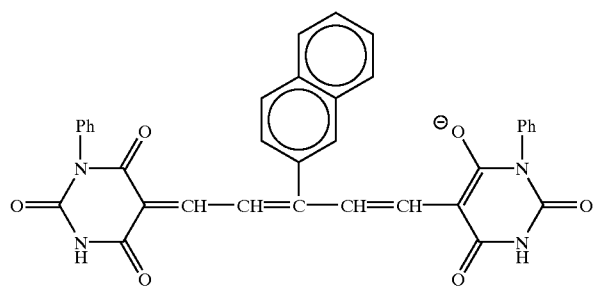
B-189
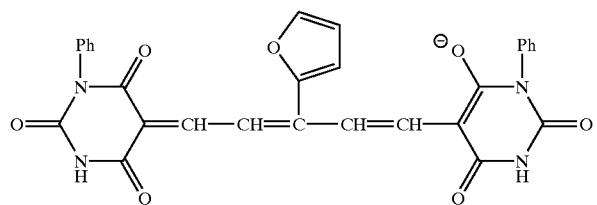

-continued
B-190
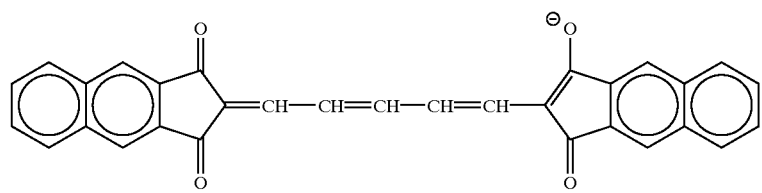
B-191
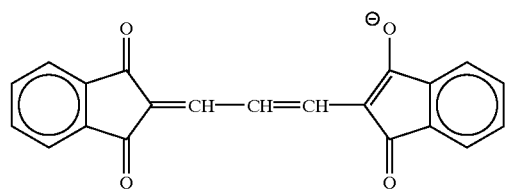
B-192
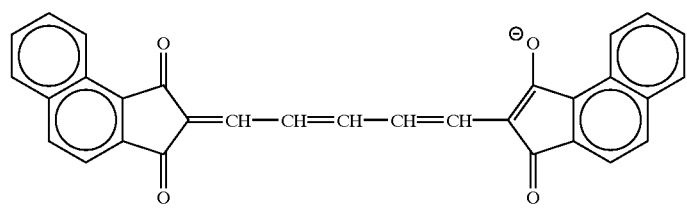
B-193
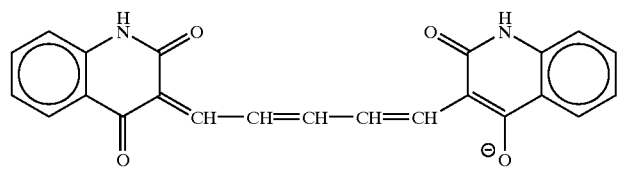
B-194
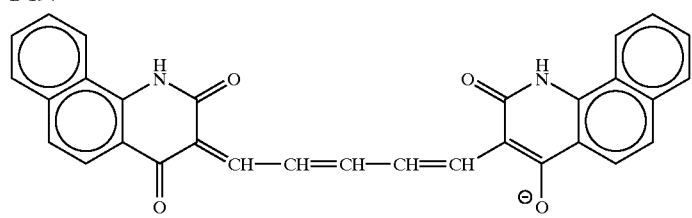
B-195
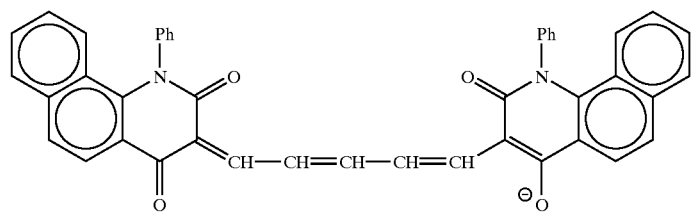
B-196
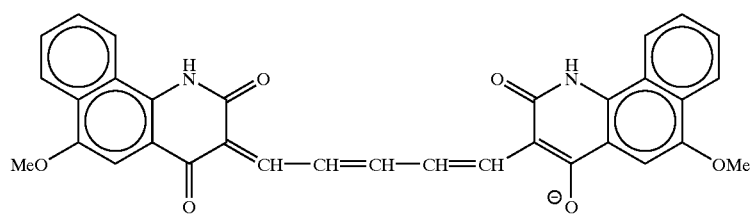

-continued
B-197
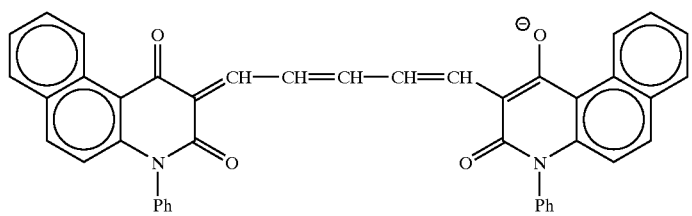
B-198
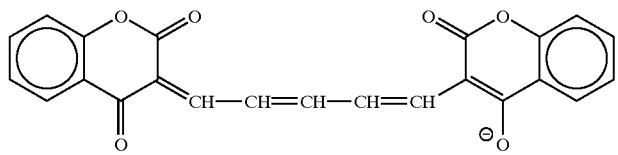
B-199
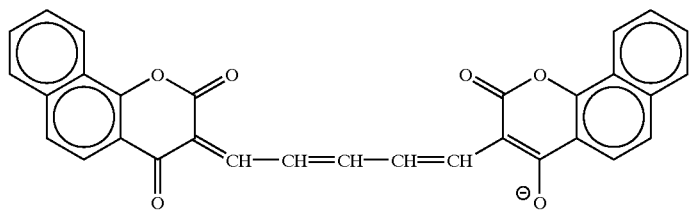
B-200
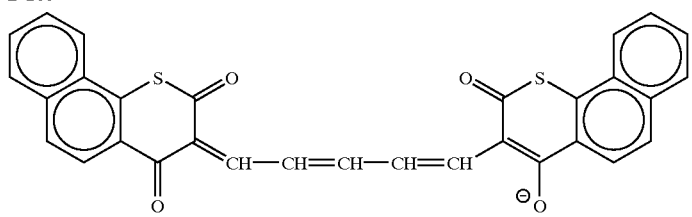
B-201
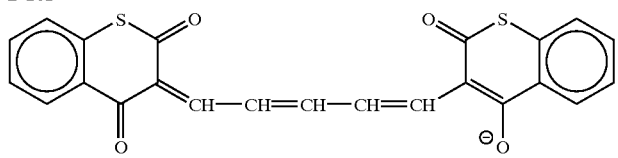
B-202
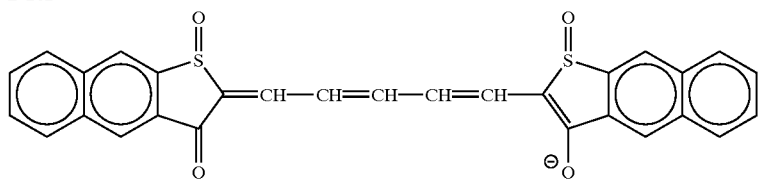
B-203
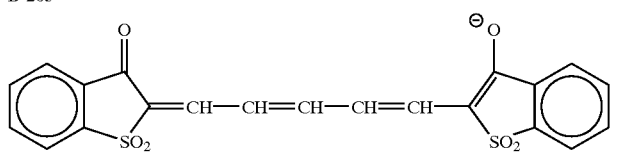
Concrete examples of preferred cation parts of the dye compounds of the formulas (I-1) and (I-2) are given below.

⊕N(CH₃)₄     C-1
⊕N(C₂H₅)₄     C-2
⊕N(C₄H₉⁽ⁿ⁾)₄     C-3
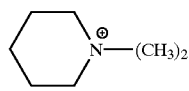
C-4
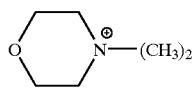
C-5
PhCH₂N⊕(CH₃)₃     C-6
Ph—N⊕(CH₃)₃     C-7
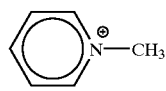
C-8
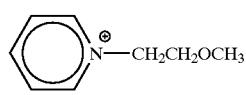
C-9
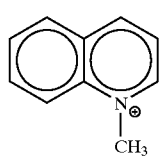
C10
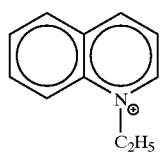
C-11
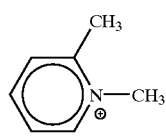
C-12
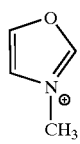
C13
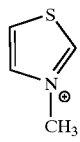
C-14
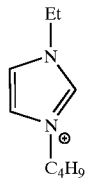
C-15

-continued

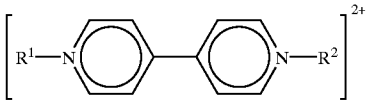
C-16

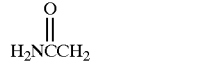

| No. | R¹ | R² |
|---|---|---|
| C-17 | $CH_3$ | $CH_3$ |
| C-18 | $C_2H_5$ | $C_2H_5$ |
| C-19 | $n\text{-}C_3H_7$ | $n\text{-}C_3H_7$ |
| C-20 | $n\text{-}C_4H_9$ | $n\text{-}C_4H_9$ |
| C-21 | $iso\text{-}C_4H_9$ | $iso\text{-}C_4H_9$ |
| C-22 | $n\text{-}C_6H_{13}$ | $n\text{-}C_6H_{13}$ |
| C-23 | $PhCH_2$ | $PhCH_2$ |
| C-24 | $CH_3\text{—}CH\text{=}CH\text{—}CH_2$ | $CH_3\text{—}CH\text{=}CH\text{—}CH_2$ |
| C-25 | $CH_2\text{=}CH$ | $CH_2\text{=}CH$ |
| C-26 | $NCCH_2$ | $NCCH_2$ |
| C-27 | $EtO_2C\text{—}CH_2$ | $EtO_2C\text{—}CH_2$ |
| C-28 | $HOCH_2CH_2$ | $HOCH_2CH_2$ |
| C-29 | $EtOCH_2CH_2$ | $EtOCH_2CH_2$ |
| C-30 | $CH_3$ | $n\text{-}C_4H_9$ |
| C-31 | $CH_3$ | $PhCH_2$ |
| C-32 | $CH_3COCH_2$ | $CH_3COCH_2$ |
| C-33 | $H_2NC(O)CH_2$ | $H_2NC(O)CH_2$ |
| C-34 | $CF_3CH_2$ | $CF_3CH_2$ |
| C-35 | Ph | Ph |
| C-36 | 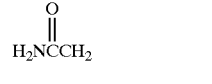 | 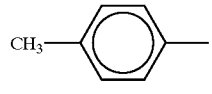 |
| C-37 | 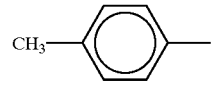 | 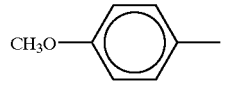 |
| C-38 | 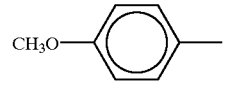 |  |
| C-39 |  | 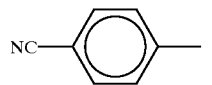 |
| C-40 | 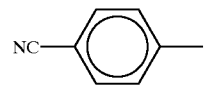 | 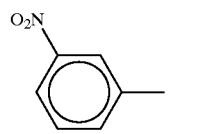 |

$[(CH_3)_3\text{—}N\text{—}CH_2\text{—}CH_2\text{—}N\text{—}(CH_3)_3]^{2+}$   C-41

$[(CH_3)_3\text{—}N\text{—}(CH_2)_6\text{—}N\text{—}(CH_3)_3]^{2+}$   C-42

$[(CH_3)_3\text{—}N\text{—}CH_2\text{—}CH_2\text{—}CH_2\text{—}O\text{—}CH_2\text{—}CH_2\text{—}O\text{—}CH_2\text{—}CH_2\text{—}CH_2\text{—}N\text{—}CH_3)_3]^{2+}$   C-43

-continued
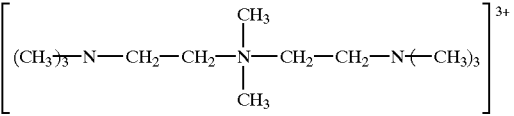 C-44
[(C₄H₉)(CH₃)₂N—CH₂—CH₂—N(CH₃)₂(C₄H₉)]²⁺   C-45
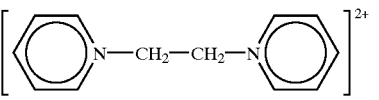 C-46
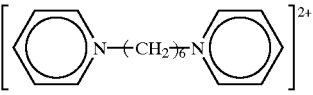 C-47
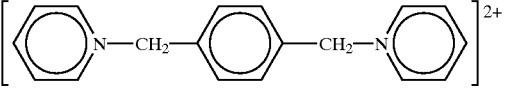 C-48
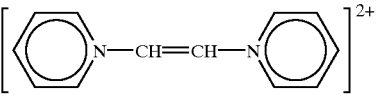 C-49
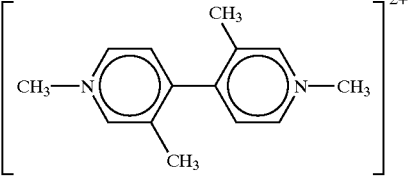 C-50
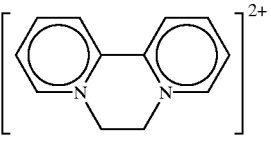 C-51
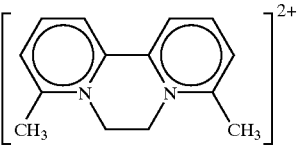 C-52
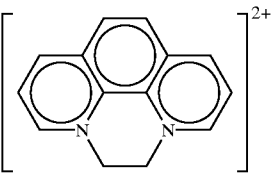 C-53
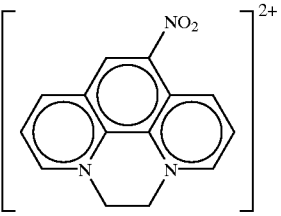 C-54

-continued
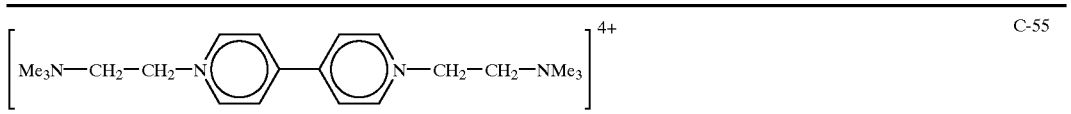
C-55
C-56
C-57
C-58
C-59
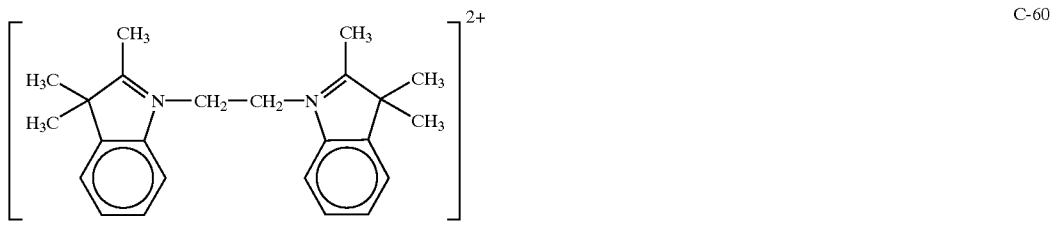
C-60
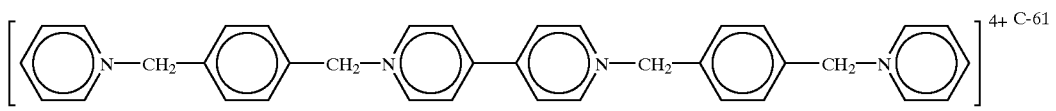
C-61
Ph$_3$P$^\oplus$Me  C-62
C$_{16}$H$_{33}$$^\oplus$P(C$_2$H$_5$)$_3$  C-63
Ph$_4$P$^\oplus$  C-64
(C$_4$H$_9$)$_4$P$^\oplus$  C-65
Ph—I$^\oplus$—Ph  C-66
Me$_3$S$^\oplus$  C-67
C-68
C-69

-continued
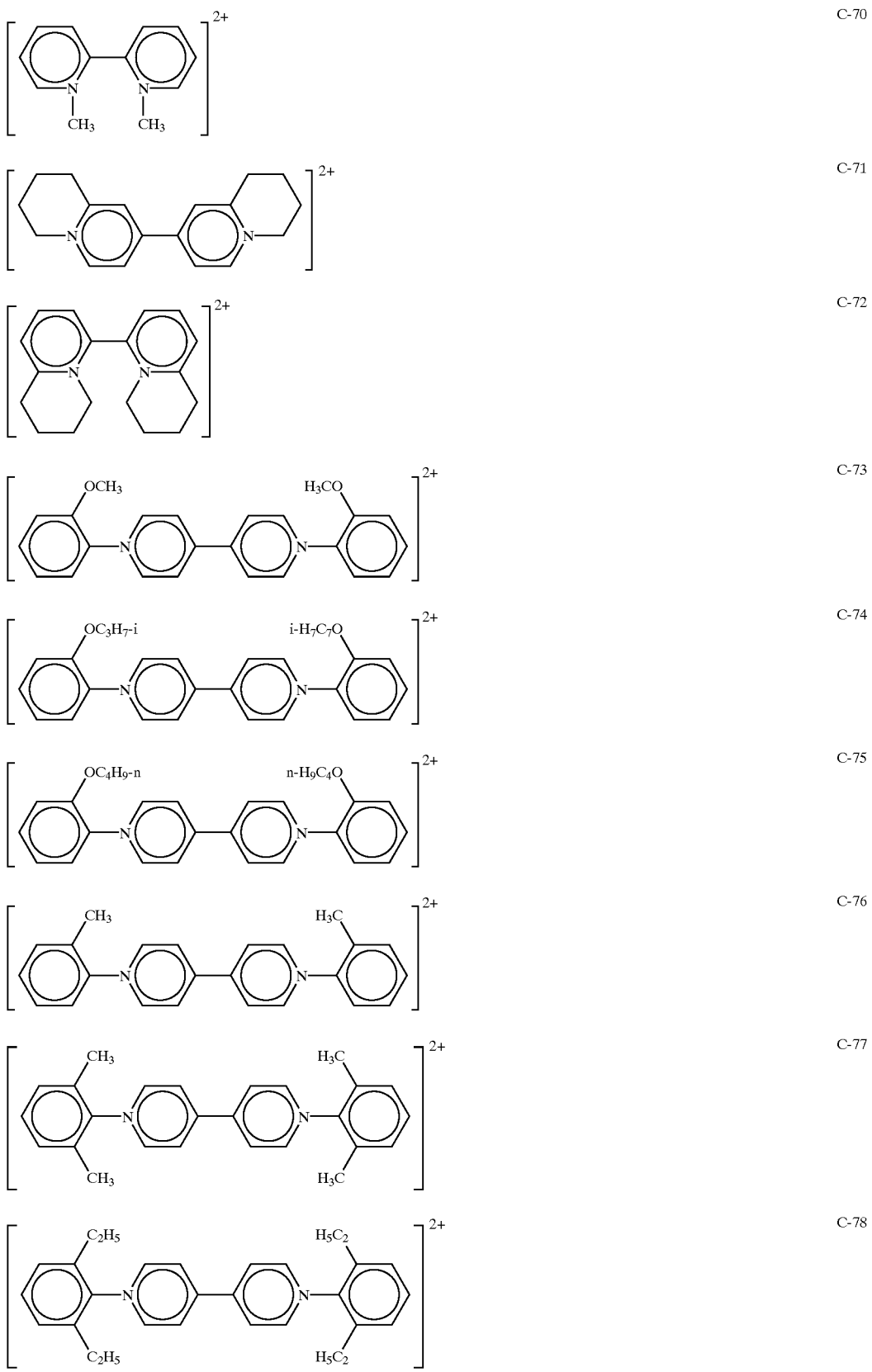

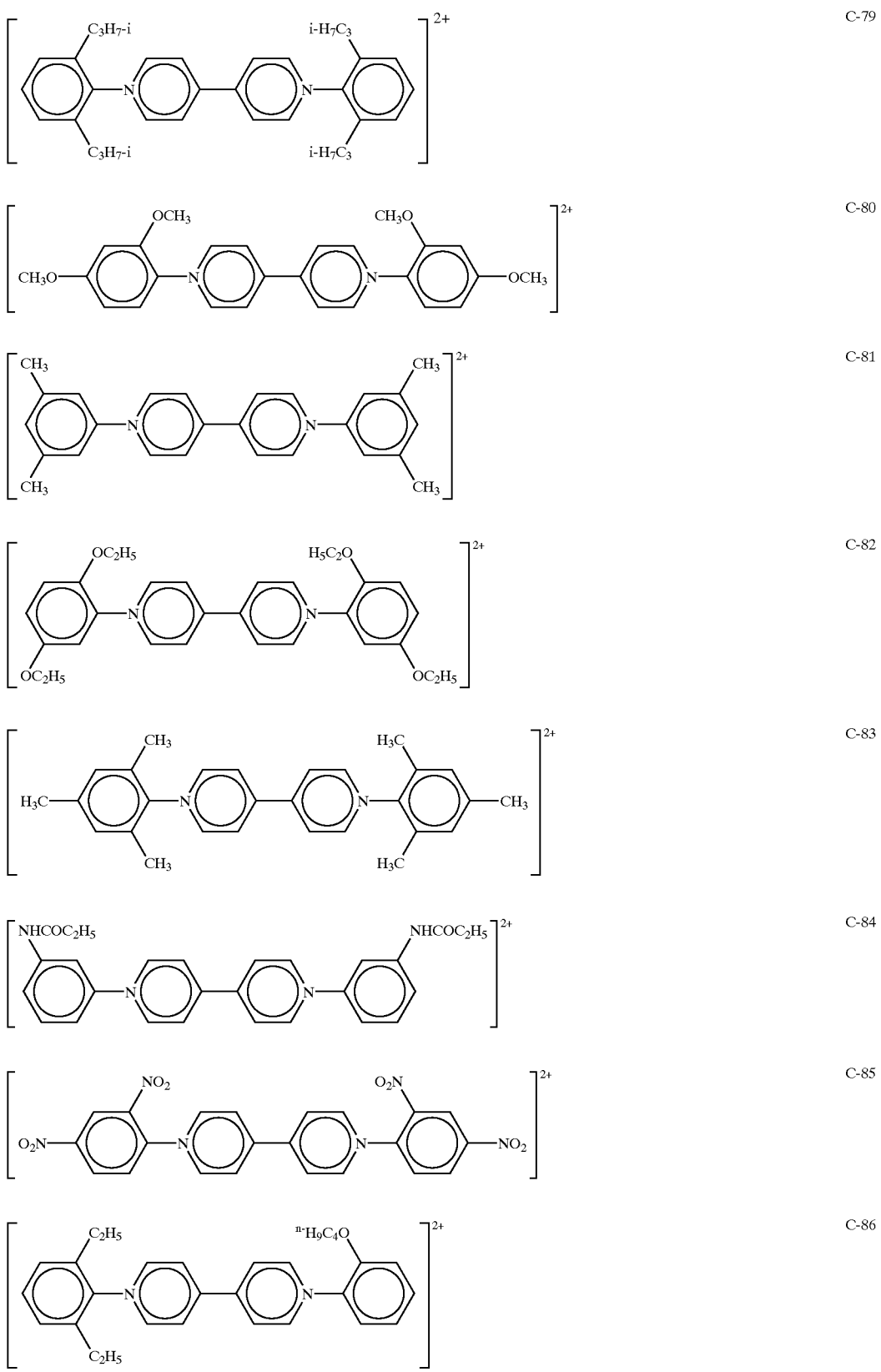

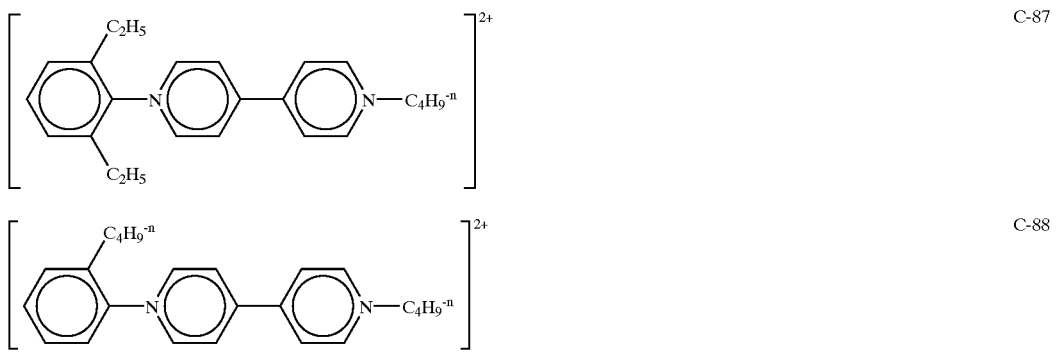

Concrete examples of the compounds preferably employable for the invention are set forth in Table 1. In Table 1, each compound is shown as a combination of the anion part and the cation part. For example, the compound of No. 1 (Compound No. 1) consists of-the anion part of (B-3) and the cation part of (C-1), and the compound of No. 5 (Compound No. 5) consists of the anion part of (B-3) and the cation part of (C-22). Consequently, each of the compounds of No. 1 and No. 5 has the below-mentioned formula:

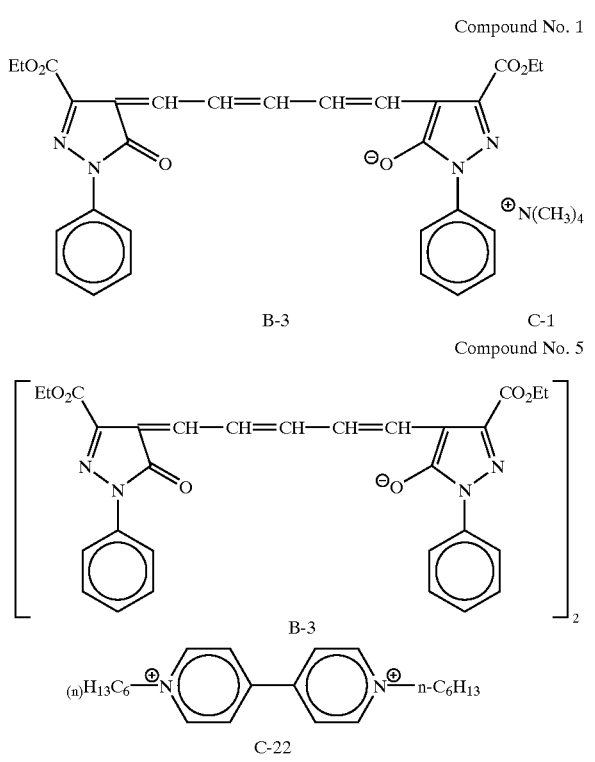

The compounds in Table 1 can be illustrated in the same manner as those of No. 1 and No. 5 described above.

TABLE 1

| Compound | anion | cation | Compound | anion | cation |
|---|---|---|---|---|---|
| No. 1 | B-3 | C-1 | No. 11 | B-6 | C-3 |
| No. 2 | B-3 | C-3 | No. 12 | B-6 | C-8 |
| No. 3 | B-3 | C-8 | No. 13 | B-6 | C-17 |
| No. 4 | B-3 | C-17 | No. 14 | B-6 | C-22 |
| No. 5 | B-3 | C-22 | No. 15 | B-6 | C-41 |
| No. 6 | B-3 | C-41 | No. 16 | B-6 | C-46 |
| No. 7 | B-3 | C-46 | No. 17 | B-6 | C-51 |
| No. 8 | B-3 | C-51 | No. 18 | B-6 | C-53 |
| No. 9 | B-3 | C-53 | No. 19 | B-9 | C-51 |
| No. 10 | B-6 | C-1 | No. 20 | B-11 | C-51 |
| No. 21 | B-20 | C-1 | No. 31 | B-25 | C-51 |
| No. 22 | B-20 | C-3 | No. 32 | B-27 | C-51 |
| No. 23 | B-20 | C-8 | No. 33 | B-40 | C-1 |
| No. 24 | B-20 | C-17 | No. 34 | B-40 | C-8 |
| No. 25 | B-20 | C-22 | No. 35 | B-40 | C-51 |
| No. 26 | B-20 | C-41 | No. 36 | B-40 | C-53 |
| No. 27 | B-20 | C-46 | No. 37 | B-41 | C-20 |
| No. 28 | B-20 | C-51 | No. 38 | B-41 | C-51 |
| No. 29 | B-20 | C-53 | No. 39 | B-41 | C-53 |
| No. 30 | B-21 | C-51 | No. 40 | B-42 | C-51 |
| No. 41 | B-53 | C-3 | No. 51 | B-64 | C-51 |
| No. 42 | B-53 | C-8 | No. 52 | B-71 | C-1 |
| No. 43 | B-53 | C-17 | No. 53 | B-71 | C-3 |
| No. 44 | B-53 | C-22 | No. 54 | B-71 | C-8 |
| No. 45 | B-53 | C-51 | No. 55 | B-71 | C-17 |
| No. 46 | B-55 | C-51 | No. 56 | B-71 | C-22 |
| No. 47 | B-61 | C-22 | No. 57 | B-71 | C-41 |
| No. 48 | B-61 | C-51 | No. 58 | B-71 | C-46 |
| No. 49 | B-61 | C-53 | No. 59 | B-71 | C-51 |
| No. 50 | B-62 | C-51 | No. 60 | B-71 | C-53 |
| No. 61 | B-75 | C-3 | No. 71 | B-82 | C-51 |
| No. 62 | B-75 | C-8 | No. 72 | B-83 | C-3 |
| No. 63 | B-75 | C-35 | No. 73 | B-83 | C-4 |
| No. 64 | B-75 | C-51 | No. 74 | B-83 | C-8 |
| No. 65 | B-75 | C-53 | No. 75 | B-83 | C-21 |
| No. 66 | B-76 | C-30 | No. 76 | B-83 | C-30 |
| No. 67 | B-76 | C-51 | No. 77 | B-83 | C-46 |
| No. 68 | B-78 | C-1 | No. 78 | B-83 | C-51 |
| No. 69 | B-78 | C-51 | No. 79 | B-83 | C-58 |
| No. 70 | B-82 | C-3 | No. 80 | B-87 | C-3 |
| No. 81 | B-87 | C-30 | No. 91 | B-107 | C-22 |
| No. 82 | B-87 | C-51 | No. 92 | B-107 | C-41 |
| No. 83 | B-93 | C-3 | No. 93 | B-107 | C-46 |
| No. 84 | B-93 | C-30 | No. 94 | B-107 | C-51 |
| No. 85 | B-93 | C-51 | No. 95 | B-115 | C-51 |
| No. 86 | B-97 | C-51 | No. 96 | B-126 | C-51 |
| No. 87 | B-97 | C-53 | No. 97 | B-134 | C-51 |
| No. 88 | B-99 | C-51 | No. 98 | B-138 | C-51 |
| No. 89 | B-99 | C-53 | No. 99 | B-152 | C-3 |
| No. 90 | B-107 | C-3 | No. 100 | B-152 | C-51 |
| No. 101 | B-155 | C-3 | No. 111 | B-162 | C-74 |
| No. 102 | B-155 | C-51 | No. 112 | B-162 | C-77 |
| No. 103 | B-161 | C-3 | No. 113 | B-164 | C-77 |
| No. 104 | B-161 | C-51 | No. 114 | B-166 | C-76 |
| No. 105 | B-3 | C-73 | No. 115 | B-167 | C-77 |
| No. 106 | B-21 | C-76 | No. 116 | B-186 | C-73 |

TABLE 1-continued

| Compound | anion | cation | Compound | anion | cation |
|---|---|---|---|---|---|
| No. 107 | B-82 | C-74 | No. 117 | B-188 | C-73 |
| No. 108 | B-82 | C-84 | No. 118 | B-192 | C-77 |
| No. 109 | B-115 | C-74 | No. 119 | B-196 | C-77 |
| No. 110 | B-162 | C-22 | No. 120 | B-198 | C-77 |
| No. 121 | B-199 | C-77 | | | |
| No. 122 | B-75 | C-85 | | | |
| No. 123 | B-75 | C-86 | | | |
| No. 124 | B-75 | C-87 | | | |

The compound represented by the formula (I-1) or (I-2) can be easily prepared by an ion-exchange reaction between the onium salt having the below-mentioned formula (VIII) and a salt of the dye compound having the below-mentioned formula (VII-1) or (VII-2). The dye compound can be used in the form of an alkaline metal salt (e.g.; Li salt, Na salt, and K salt), an ammonium salt ($NH_4^+$ salt) or a salt having an organic counter ion such as a triethylammonium salt ($Et_3NH^+$ salt) or a tributylammonium salt ($Bu_3NH^+$ salt). The ion-exchange reaction can be carried out in water or in an organic solvent (e.g., methanol, ethanol, isopropanol, and dimethylformamide).

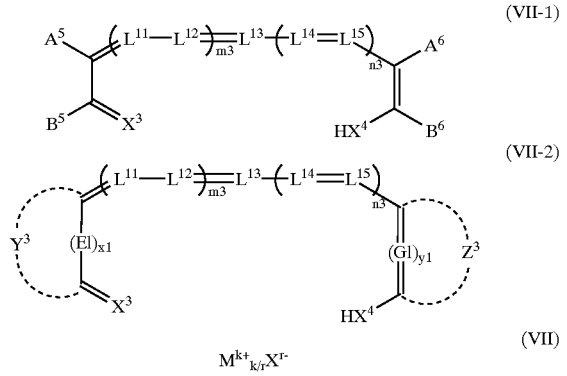

In the above formulas, $A^5$, $A^6$, $B^5$ and $B^6$; $Y^3$ and $Z^3$; $L^{11}$, $L^{12}$, $L^{13}$, $L^{14}$ and $L^{15}$; $X^3$ and $X^4$; E1 and G1; m3 and n3; and x1 and y1 are the same meaning as $A^1$, $A^2$, $B^1$ and $B^2$; $Y^1$ and $Z^1$; $L^1$, $L^2$, $L^3$, $L^4$ and $L^5$; $X^1$ and $X^2$; E and G; m and n; and x and y in the formulas (I-1) and (I-2), and $X^{r-}$ in the formula (VII) represents an anion, and r represents an integer of not less than 1 (preferably 1 to 4, more preferably 1 or 2). Examples of the anions include halide ions (e.g., $Cl^-$, $Br^-$, and $I^-$), sulfonato ions ($CH_3SO_3^-$, p-toluenesulfonato ion, and naphthalene-1,5-disulfonato ion), $ClO_4^-$, $BF_4^-$, and $PF_6^-$.

The dye compound represented by the formula (VII-1) or (VII-2) can be prepared by a condensation reaction between the corresponding active methylene compound (e.g., pyrazolone, thiobarbituric acid, barbituric acid, indandione, and hydroxyphenalenone) and the methine source to introduce a methine group or polymethine group into the methine dye. The methine source are described in detail in Japanese Patent Publication Nos. 39-22069, 43-3504, 52-38056, 54-38129, 55-10059, 58-35544; Japanese Patent Provisional Publication Nos. 49-99620, 52-92716, 59-16834, 63-316853, 64-40827; British Patent No. 1133986; U.S. Pat. Nos. 3,247,127, 4,042,397, 4,181,225, 5,213,956 and 5,260,179. Concrete examples of the methine source for introducing of monomethine group include ortho esters (e.g., ethyl orthoformate and ethyl orthoacetate) and N,N-diphenylformamidine hydrochloride. Examples of the methine source for introducing of trimethine chain include trimethoxypropane, 1,1,3,3-tetramethoxypropane and malonaldehydodianyl hydrochloride (and the derivatives of those above described). Examples of the methine source for introducing of pentamethine chain include glutaconaldehydodianyl hydrochloride and 1-(2,4-dinitrophenyl)-pyridiniumchloride (and the derivatives of those above described).

The syntheses of the dye compounds represented by the formula (I-1) or (I-2) are described below.

SYNTHESIS EXAMPLES

Synthesis Example 1

Synthesis of Compound No. 5

1 g of the compound (a) having the below-illustrated formula was added to 20 ml of 0.1 N aqueous NaOH solution, and stirred at room temperature. Independently, 0.5 g of the compound (b) having the below-mentioned formula was dissolved in 5 ml of water. The prepared solutions were mixed and stirred at room temperature for 30 minutes, and then the formed precipitate was collected by filtration. The obtained precipitate was washed successively with water and ethanol, and then dried to give 0.23 g of the desired compound. $\lambda_{max}$=654 nm (in methanol)

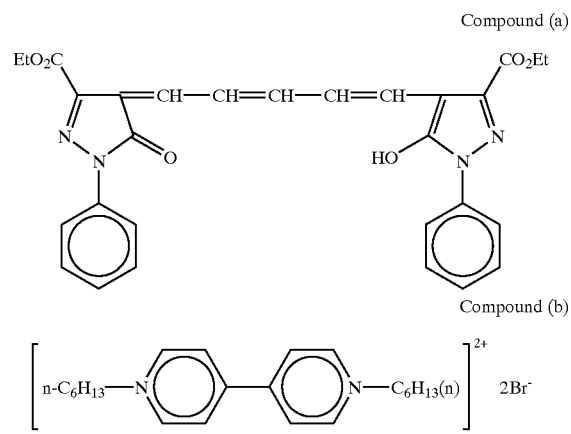

Synthesis Example 2

Synthesis of Compound No. 8

0.53 g of the above compound (a) was added to 10 ml of 0.1 N aqueous NaOH solution, and stirred at room temperature. Independently, 0.2 g of the compound (c) having the below-mentioned formula was dissolved in 5 ml of water. The prepared solutions were mixed and stirred at room temperature for 30 minutes, and then the formed precipitate was collected by filtration. The obtained precipitate was washed successively with water and ethanol, and then dried to prepare 0.4 g of the desired compound. $\lambda_{max}$=654 nm (in methanol)

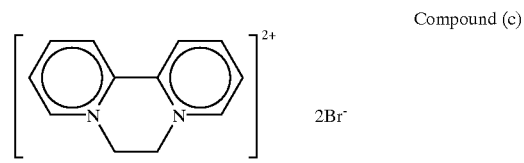

Synthesis Example 3

Synthesis of Compound No. 9

1 g of the above compound (a) was suspended in 20 ml of water. To the prepared suspension, 20 ml of 0.1 N aqueous NaOH solution was added and stirred at room temperature. Independently, 0.4 g of the compound (d) having the below-mentioned formula was dissolved in 5 ml of water. The prepared liquids were mixed and stirred at room temperature for 30 minutes, and then the formed precipitate was collected by filtration. The obtained precipitate was washed with water and ethanol, and then dried to prepare 0.2 g of the desired compound. $\lambda_{max}$=654 nm (in methanol)

Compound (d)

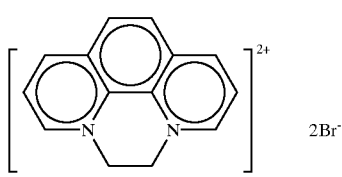

Synthesis Example 4

Synthesis of Compound No. 28

1 g of the compound (e) having the below-mentioned formula was added in 10 ml of methanol. Into the prepared solution, 0.1 ml of 25 aqueous $NH_3$ solution was dropped under stirring at room temperature. Independently, 0.5 g of the above compound (c) was dissolved in 2 ml of water. The prepared solutions were mixed and stirred at room temperature for 30 minutes, and then the formed precipitate was collected by filtration. The obtained precipitate was washed with methanol, and then dried to prepare 0.8 g of the desired compound. $\lambda_{max}$=637 nm (in methanol)

Compound (e)

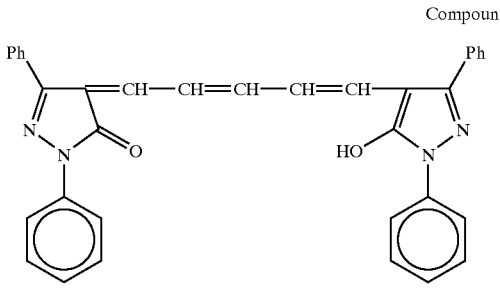

Synthesis Example 5

Synthesis of Compound No. 67

0.55 g of the compound (f) having the below-mentioned formula was dissolved in 10 ml of DMF. To the prepared solution, 0.17 g of the above compound (c) was added and stirred at room temperature for 1 hour, and then 70 ml of water was added to form precipitate. The precipitate was collected by filtration and washed with methanol, and then dried to prepare 0.5 g of the desired compound. $\lambda_{max}$=607 nm (in methanol):

Compound (f)

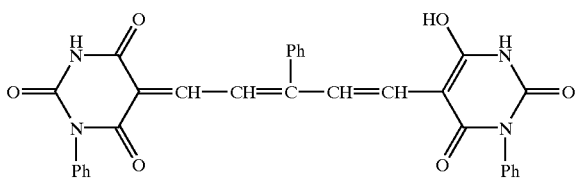

Synthesis Example 6

Synthesis of Compound No. 71

0.93 g of the compound (g) having the below-mentioned formula was added in 30 ml of methanol. Independently, 0.35 g of the above compound (c) was dissolved in 20 ml of methanol. The prepared solutions were mixed and stirred at room temperature for 150 minutes to form precipitate. The precipitate was collected by filtration and washed with methanol, and then dried to prepare 0.9 g of the aimed compound. $\lambda_{max}$=633 nm (in methanol)

Compound (g)

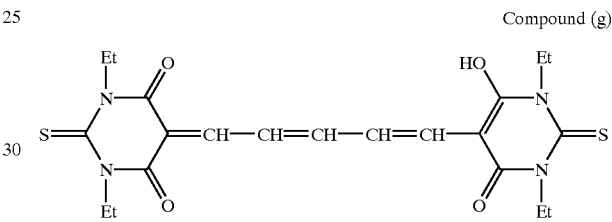

Synthesis Example 7

Synthesis of Compound No. 86

1.0 g of the compound (h) having the below-mentioned formula was added in methanol, and then 0.35 ml of triethylamine was further added. To the solution, 0.46 g of the above compound (c) was added and stirred at room temperature for 60 minutes to form precipitate. The precipitate was collected by filtration and washed with methanol, and then dried to prepare 0.85 g of the desired compound. $\lambda_{max}$=661 nm (in methanol)

Compound (h)

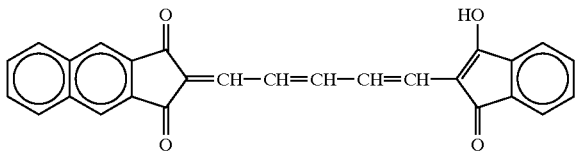

Synthesis Example 8

Synthesis of Compound No. 89

1.1 g of the compound (i) having the below-mentioned formula was added in 2.5 ml of 1 N aqueous NaOH solution. To the solution, 0.46 g of the above compound (d) was added and stirred at room temperature for 60 minutes to form precipitate. The precipitate was collected by filtration and washed with methanol, and then dried to prepare 0.9 g of the desired compound. $\lambda_{max}$=652 nm (in methanol)

Compound (i)

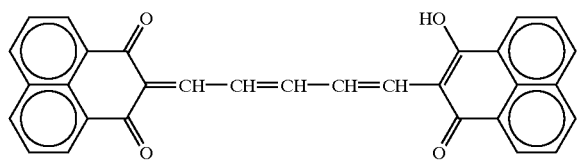

Compound (j)

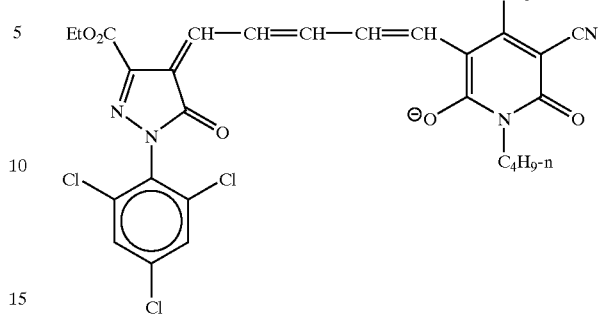

Synthesis Examples 9–11

Synthesis of Compounds Nos. 45, 46 and 98

Compounds Nos. 45, 46 and 98 were synthesized in the same manner as in the Synthesis Example 2 or 4. The absorption spectrum of each prepared compound in methanol was observed to find the absorption maximum ($\lambda_{max}$) as follows:

Compound No. 45: $\lambda_{max}$ located at 654 nm;

Compound No. 46: $\lambda_{max}$ located at 674 nm; and

Compound No. 98: $\lambda_{max}$ located at 603 nm.

Synthesis Example 12

Synthesis of Compound No. 1

2.6 g of the above compound (a) was added in 50 ml of 0.1 N NaOH aqueous solution. To the solution, 0.8 g of tetramethylammoniumbromide was added and stirred at room temperature for 60 minutes to form precipitate. The precipitate was collected by filtration washed with water, and then dried to prepare 2.45 g of the desired compound. $\lambda_{max}$=654 nm (in methanol).

Synthesis Examples 13–15

Synthesis of Compounds Nos. 3, 6 and 7

The procedure of Synthesis Example 12 was repeated except that tetramethylammonium bromide was replaced with each corresponding quaternary ammonium bromide, to synthesize each of Compounds Nos. 3, 6 and 7. $\lambda_{max}$=654 nm (in methanol) for all

Synthesis Example 16

Synthesis of Compound No. 99

1.3 g of the compound (j) having the below-mentioned formula was added in 10 ml of methanol. Into the prepared solution, 0.15 ml of 25% aqueous NH$_3$ solution was dropped under stirring at room temperature, and then 1.4 g of tetrabutylammonium bromide was added and stirred at room temperature for 60 minutes to form precipitate. The precipitate was collected by filtration and washed with methanol, and then dried to prepare 0.2 g of the desired compound. $\lambda_{max}$=671 nm (in methanol)

Synthesis Example 17

Synthesis of Compound No. 100

1.3 g of the above compound (j) was added in 10 ml of methanol. Into the prepared solution, 0.15 ml of 25% NH$_3$ aqueous solution was dropped under stirring at room temperature. Independently, 0.38 g of the above compound (c) was dissolved in 20 ml of methanol. The prepared solutions were mixed and stirred at room temperature for 120 minutes to form precipitate. The precipitate was collected by filtration and washed with methanol, and then dried to prepare 0.7 g of the desired compound. $\lambda_{max}$=671 nm (in methanol)

Synthesis Example 18

Synthesis of Compound No. 102

The procedure of Synthesis Example 17 was repeated except that the compound (j) was replaced with 1.1 g of the compound (k) having the below-mentioned formula, to prepare 0.45 g of Compound No. 102. $\lambda_{max}$=655 nm (in methanol)

Compound (k)

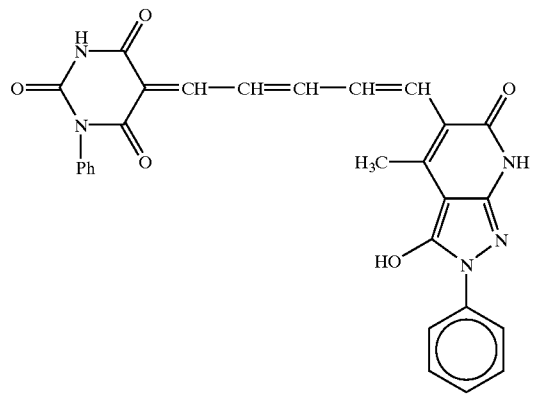

Synthesis Example 19

Synthesis of Compound No. 106

1.0 g of the compound (l) having the below-mentioned formula was added in 10 ml of methanol, and then 0.2 ml of triethylamine was further added. Independently, 0.3 g of the compound (m) having the below-mentioned formula was dissolved in 10 ml of methanol. The prepared solutions were mixed and stirred at room temperature for 60 minutes to form precipitate. The precipitate was collected by filtration and washed with methanol, and then dried to prepare 0.6 g of the desired compound. $\lambda_{max}$=636 nm (in methanol)

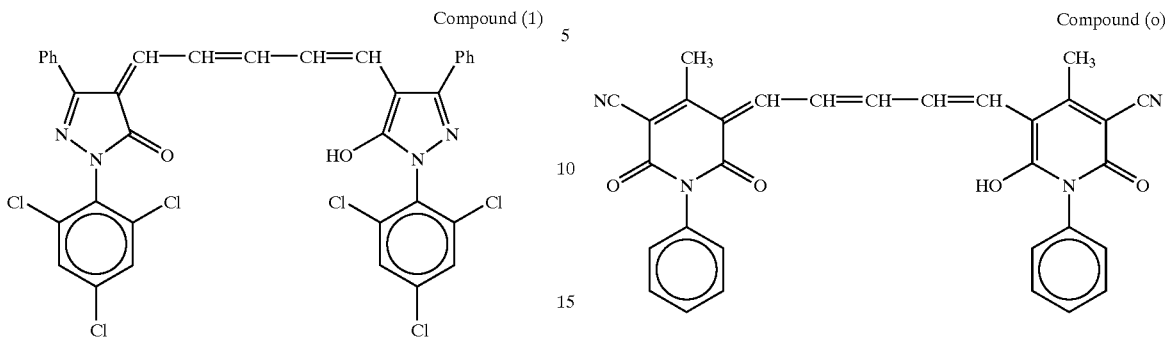

Compound (1)

Compound (o)

Compound (m)

Synthesis Example 20
Synthesis of Compound No. 107

1.6 g of the aforementioned compound (g) was added in 20 ml of methanol, and then 0.5 ml of triethylamine was further added. Independently, 1 g of the compound (n) having the below-mentioned formula was dissolved in 5 ml of methanol. The prepared solutions were mixed and stirred at room temperature for 60 minutes to form precipitate. The precipitate was collected by filtration and washed with methanol, and then dried to prepare 1.6 g of the desired compound. $\lambda_{max}$=640 nm (in DMF).

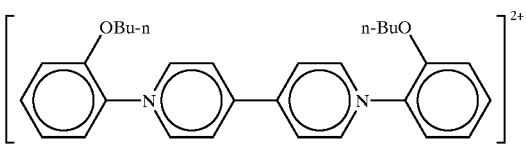

Compound (n)

Synthesis Example 21
Synthesis of Compound No. 109

2.5 g of the compound (o) having the below-mentioned formula was added in 50 ml of DMF, and then 1 ml of triethylamine was further added. Independently, 1.5 g of the compound (n) was dissolved in 5 ml of methanol. The prepared solutions were mixed and then 50 ml of methanol was dropwise added. The solution was stirred at room temperature for 60 minutes to form precipitate. The precipitate was collected by filtration and washed with methanol, and then dried to prepare 3 g of the desired compound. $\lambda_{max}$=707 nm (in methanol)

Synthesis Example 22
Synthesis of Compound No. 112

3.5 g of the compound (p) having the below-mentioned formula was added in 50 ml of methanol, and then 1.5 ml of triethylamine was further added. Independently, 2.5 g of the compound (q) having the below-mentioned formula was dissolved in 10 ml of methanol. The prepared solutions were mixed to form precipitate. The precipitate was collected by filtration and washed with methanol, and then dried to prepare 4.4 g of the desired compound. $\lambda_{max}$=661 nm (in DMF).

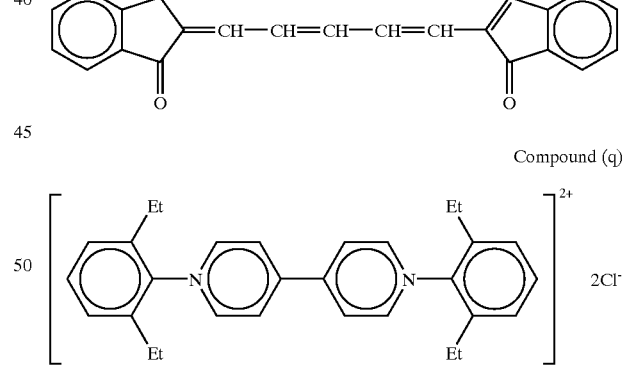

Compound (p)

Compound (q)

Synthesis Example 23
Synthesis of Compound No. 115

The procedure of Synthesis Example 22 was repeated except that the compound (p) was replaced with 4.6 g of the compound (r) having the below-mentioned formula, to synthesize 2.3 g of Compound No. 115. $\lambda_{max}$=655 nm (in methanol)

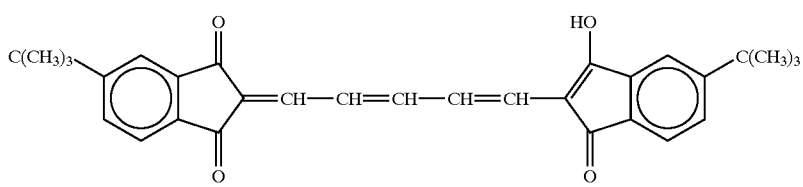

Compound (r)

Synthesis Example 24

Synthesis of Compound No. 116

0.3 g of the compound (s) having the following formula was added to the mixed solvent of 5 ml of DMF and 15 ml of methanol, and then 1.2 ml of tributylamine was dropwise added under stirring. The resulting solution was further stirred for 30 minutes at room temperature, and then 0.3 g of the compound (t) having the below-mentioned formula was added. The solution was kept stirring for 2 hours to form precipitate. The precipitate was collected by filtration and washed with methanol, and then dried to prepare 0.25 g of the desired compound. $\lambda_{max}$=606 nm (in DMF).

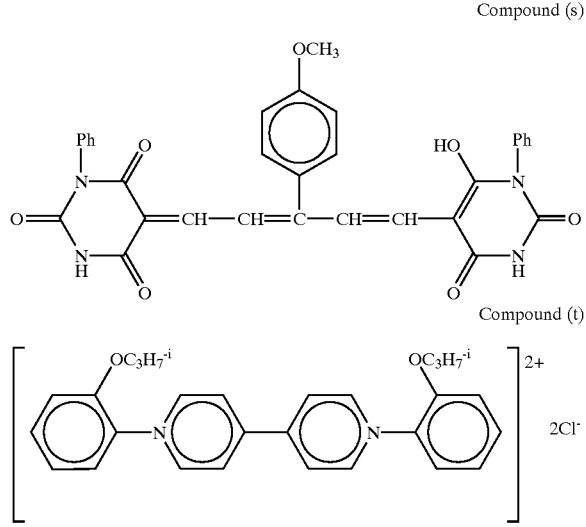

Compound (s)

Compound (t)

Synthesis Example 25

Synthesis of Compound No. 117

0.23 g of the compound (u) having the following formula was added in methanol, and then 1.2 ml of tributylamine was further added. To the resulting solution, 0.28 g of the above compound (t) was added. The resulting solution was stirred at room temperature for 60 minutes to form precipitate. The precipitate was collected by filtration and washed with methanol, and then dried to prepare 0.22 g of the desired compound. $\lambda_{max}$=609 nm (in DMF).

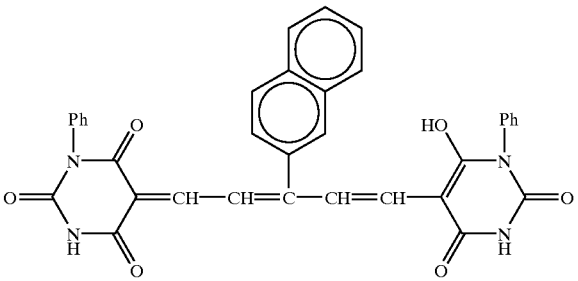

Compound (u)

Each of the compounds of the formula (I-1) or (I-2) of the invention can be employed singly or in combination with two or more compounds. Further, a combination of plural compounds having the formula (I-1) and a combination of plural compounds having the formula (I-2) can be also employed. Furthermore, the compound of the invention can be also employed in combination with other known compounds.

The information recording medium of the invention has a recording layer provided on a support, in which the recording layer contains the dye compound represented by the formula (I-1) and/or (I-2). The information recording medium of the invention preferably has a light-reflecting layer provided on the recording layer, and preferably has the medium also has a protective layer provided on the light-reflecting layer.

The information recording medium of the invention can be prepared by the following method.

The substrate (support) which is transparent can be made of any of materials known as the materials for the producing the substrate of the light information recording medium. Examples of the materials include glass, polycarbonate, acrylic resins such as polymethyl methacrylate, vinyl chloride resins such as polyvinyl chloride and vinyl chloride copolymer, epoxy resins, amorphous polyolefins, and polyesters. These materials can be employed in combination, if desired. These materials are molded to give a film or a rigid plate. Most preferred is a polycarbonate resin from the viewpoints of anti-humidity and dimensional stability.

The substrate may have on its surface on the recording layer side an undercoating layer for enhancing surface smoothness and adhesion, and keeping the dye recording layer from deterioration. Examples of the material for the undercoating layer include polymers such as polymethyl methacrylate, acrylate-methacrylate copolymer, styrene-maleic anhydride copolymer, polyvinyl alcohol, N-methylolacrylamide, styrene-vinyltoluene copolymer, chlorosulfonated polyethylene, nitrocellulose, polyvinyl chloride, chlorinated polyolefin, polyester, polyimide, vinyl acetate-vinyl chloride copolymer, ethylene-vinyl acetate copolymer, polyethylene, polypropylene, and polycarbonate, and surface treating agents such as a silane-coupling agent.

The undercoating layer can be formed by coating a solution in which one or more of the above-mentioned materials are dissolved or dispersed on the surface of the substrate by the known coating methods such as spin-coat, dip-coat, and extrusion-coat. The undercoating layer generally has a thickness of 0.005 to 20 μm, preferably 0.01 to 10 μm.

On the surface of the substrate or on the undercoating layer, groove for tracking or giving address signals is preferably formed. The groove is preferably formed directly on the surface of the substrate when the substrate is molded from polymer material by injection or extrusion.

Alternatively, the groove can be provided on the surface of the substrate by placing a pregroove layer. The pregroove layer can be produced from a mixture of a monomer such as monoester, diester, triester, or tetraester of acrylic acid, or its oligomer, and a light-polymerization reaction initiator. The pregroove layer can be produced by the steps of coating a mixture of the polymerization initiator and the monomer such as the above-mentioned acrylic ester on a precisely produced stamper, placing on the coated layer a substrate, and irradiating the coated layer with ultra-violet rays through the stamper or substrate, so as to cure the coated layer as well as to combine the cured layer and the substrate. The substrate to which the cured coated layer is attached is separated from the stamper, to give the desired substrate equipped with the pregroove layer. The thickness of the pregroove layer generally is in the range of 0.05 to 100 μm, preferably in the range of 0.1 to 50 μm.

The pregroove formed on the substrate preferably has a depth in the range of 300 to 2,000 angstroms and a half-width of 0.2 to 0.9 μm. The depth of 1,500 to 2,000 angstroms of the pregroove is preferably adopted because such pregroove can enhance the sensitivity without decreasing the light-reflection on the substrate. The optical disc having a recording layer (containing the dye compound of the formula (I-1) or (I-2)) coated on the deep pregoove and a light-reflection layer shows a high sensitivity, and hence is employable even in a recording system using a laser light of low laser power. This means that a semiconductor laser of a low coat can be employed or the life of semiconductor laser can be prolonged.

On the substrate, optionally via the undercoating, the recording layer containing the above-described dye compound of the invention is placed.

In order to improve light-resistance, the recording layer may contain various compounds known as singlet oxygen quencher. Examples of such compounds include a metal complex represented by the formula (III), (IV) or (V) of Japanese Patent Provisional Publication No. H3-224793; diimmonium salt; aminium salt; and nitroso compounds described in Japanese Patent Provisional Publications Nos. H2-300287 and H2-300288.

The recording layer can be formed on the substrate (support) by coating a solution of a mixture of the dye of the invention, and if desired, quencher and binder in an organic solvent and drying the coated layer. Examples of the organic solvents include esters such as butyl acetate and cellosolve acetate; ketones such as methyl ethyl ketone, cyclohexanone and methyl isobutyl ketone; chlorinated hydrocarbons such as dichloromethane, 1,2-dichloroethane and chloroform; amides such as dimethylformamide; hydrocarbons such as cyclohexanone; ethers such as tetrahydrofuran, diethyl ether and dioxane; alcohols such as ethanol, n-propanol, isopropanol, n-butanol, and diacetone alcohol; fluorine-containing solvents such as 2,2,3,3-tetrafluoropropanol; and glycol ethers such as ethyleneglycol monomethyl ether, ethyleneglycol monoethyl ether, and propyleneglycol monomethyl ether. These solvents can be employed in combination, in consideration of the solubility of the used compound in the solvent.

The coating solution can further contain auxiliary additives such as an oxidation inhibitor, a UV absorber, a plasticizer, and a lubricant.

Examples of the binders include natural-origin polymers such as gelatin, cellulose derivatives, dextran, rosin, and rubber; hydrocarbon polymer resins such as polyethylene, polypropylene, polystyrene and polyisobutyrene; vinyl polymers such as polyvinyl chloride, polyvinylidene chloride, and vinyl chloride-vinyl acetate copolymer; acrylate polymers such as polymethyl acrylate and polymethyl methacrylate; polyvinyl alcohol, chlorinated polyethylene; epoxy resins; butyral resins, rubber derivatives, and thermosetting resins such as prepolymers of phenol-formaldehyde. The binder is optionally employed in the amount of 0.01 to 50 weight parts, preferably 0.1 to 5 weight parts, per 1 weight part of the dye.

The coating solution generally has a concentration of 0.01 to 10 weight % (solid content), preferably 0.1 to 5 weight %.

The coating can be performed by the known methods such as spray coat, spin coat, dip coat, roller coat, blade coat, doctor roller coat and screen print.

The recording layer can be a single layer or can comprise plural layers. The thickness of the recording layer generally is in the range of 20 to 500 nm, preferably 50 to 300 nm. The recording layer can be provided on both of the surfaces of the substrate.

On the recording layer, the light-reflecting layer is placed so as to enhance the light-reflection in the course of reproduction of information.

The light-reflecting material to be used for the formation of the light-reflecting layer should show a high reflection to the laser light. Examples of the light-reflecting materials include metals and submetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi. Stainless steel film is also employable. Preferred light-reflecting material is Cr, Ni, Pt, Cu, Ag, Au and Al. These materials can be employed singly or in the form of alloy.

The light-reflecting layer can be formed on the recording layer by vacuum deposition, sputtering or ion-plating. The thickness of the light-reflecting layer generally is 10 to 200 nm, preferably 50 to 200 nm.

On the light-reflecting layer can be placed a protective layer. The protective layer can be placed on the substrate on the side not having the recording layer.

The protective layer can be formed of inorganic materials such as SiO, $SiO_2$, $MgF_2$, $SnO_2$, $Si_3N_4$; or organic materials such as thermoplastic resins, thermo-setting resins, and UV curable resins.

The protective layer can be formed on the light-reflecting layer or the substrate by laminating a film of plastic material using an adhesive. The inorganic material can be placed on the light-reflecting layer or the substrate by vacuum deposition or spattering. The organic polymer material can be coated in the form of a solution containing the polymer material and dried to give the protective layer. The UV curable resin is dissolved in a solvent and coated on the light-reflecting layer or the substrate, and cured by applying ultra-violet rays to the coated layer. The coating layer can contain various additives such as an anti-static agent, an oxidation inhibitor, and a ultra-violet absorber. The protective layer generally has a thickness of 0.1 to 100 μm.

The information recording medium of the invention can comprise one substrate having one or two recording layers or two substrates each of which has one recording layer and combined to give a known air sandwich structure.

The information recording medium of the invention shows a high light-reflection and an improved light-resistance as well as good recording and reproducing characteristics. Particularly, the information recording medium of the invention shows an extremely high light-reflection of as high as 70%, and hence the reproduction of the recorded information can be accomplished by means of a commercially available CD player.

The information recording can be made in the following manner using the recording medium of the invention.

The information recording medium is rotated at a predetermined constant line rate (1.2 to 14 m/sec., in the case of CD format) or a predetermined constant angle rate. On the rotated medium, a recording light source such as a semiconductor laser beam is applied through the transparent substrate. By the application of the laser beam, a pit is formed in the recording layer. The pit is assumed to be produced by local vacancy of the recording layer, deformation of the recording layer and/or the substrate, change of the physical or chemical characteristics of the recording layer. The light source preferably is a semiconductor layer having an oscillation frequency in the range of 500 to 850 nm. The preferred beam wave-length is in the range of 500 to 800 nm. In the case of the CR-R type recording medium, the laser beam preferably has a wavelength of 770 to 790 nm, while in the case of DVD-R type recording medium, the laser beam preferably has a wavelength of 630 to 680 nm.

The reproduction of the recorded information can be accomplished by applying a semiconductor laser beam on the medium rotated at the same rate as that employed in the recording procedure. The light-reflection is then detected on the substrate side.

The present invention is further described by the following non-restrictive working examples.

Example 1

3 g of the oxonol dye compound (Compound No. 1) of the invention was dissolved in 100 ml of 2,2,3,3-tetrafluoropropanol to give a coating solution.

The coating solution was coated by spin coat on the surface of a polycarbonate substrate (diameter: 120 mm, thickness: 1.2 mm) to give a coated layer of approx. 200 nm thick. The substrate had a spirally formed pregroove CL (track pitch: 1.7 μm, groove width: 0.4 μm, depth: 0.16 μm) which was produced in the injection molding of the substrate.

On the coated dye layer was placed a light-reflecting layer of gold (thickness: approximately 100 nm) by sputtering, and then a UV curable photopolymer (UV curable agent: SD-220, available from Dainippon Ink & Chemicals, Inc.) was coated to give a coated layer of 7 μm thick. The coated layer was irradiated with ultra-violet rays to be cured to form a protective layer. Thus, an information recording disc according to the invention was prepared.

Examples 2–15

The procedure of Example 1 was repeated except that the above oxonol dye compound (Compound No. 1) was replaced with the same amount of each of the compounds set forth in Table 2, to prepare information recording discs according to the invention.

Comparison Example 1

The procedure of Example 1 was repeated except that the above oxonol dye compound (Compound No. 1) was replaced with the same amount of the following cyanine dye compound (Compound A) having the cation part of dye component and the anion part of perchlorate ion, to prepare an information recording disc for comparison.

Compound A

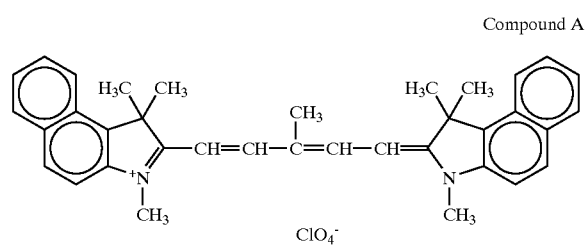

Comparison Example 2

The procedure of Example 1 was repeated except that the above oxonol dye compound (Compound No. 1) was replaced with the same amount of the following oxonol dye compound (Compound B) having an ammonium salt substituted with three ethyl groups in the cation part, to prepare an information recording disc for comparison:

Compound B

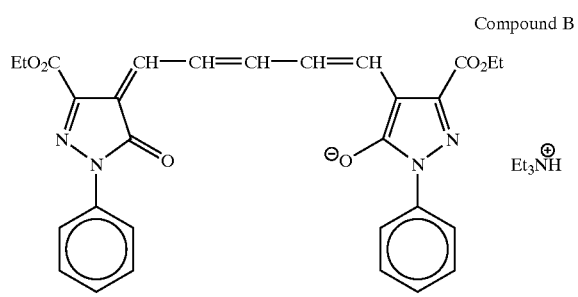

Comparison Example 3

The procedure of Example 1 was repeated except that the above oxonol dye compound (Compound No. 1) was replaced with the same amount of the following oxonol dye compound (Compound C) having an ammonium salt substituted with three ethyl groups in the cation part, to prepare an information recording disc for comparison.

Compound C

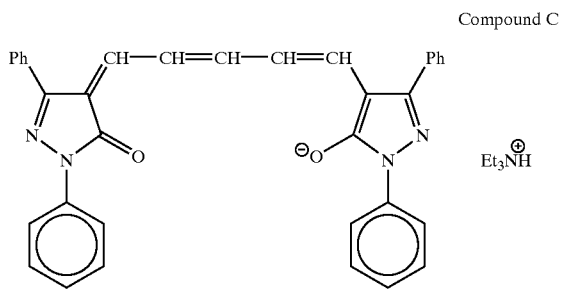

Comparison Example 4

The procedure of Example 1 was repeated except that the above oxonol dye compound (Compound No. 1) was replaced with the same amount of the following oxonol dye compound (Compound D) having an ammonium-salt in the cation part, to prepare an information recording disc for comparison.

Compound D

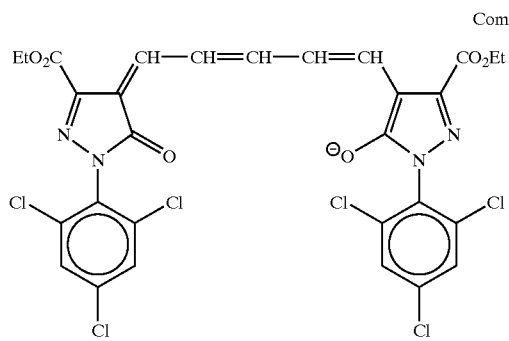

Comparison Example 5

The procedure of Example 1 was repeated except that the above oxonol dye compound (Compound No. 1) was replaced with the same amount of the following oxonol dye compound (Compound E) having an ammonium salt substituted with three ethyl groups in the cation part, to prepare an information recording disc for comparison.

Compound E

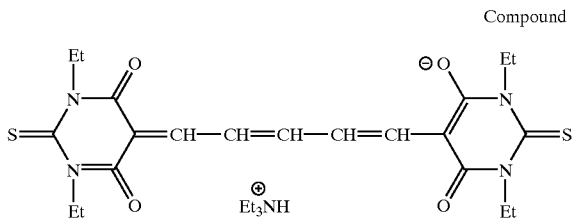

[Evaluation of Information Recording Disc]

(1) Modulation

On the recording medium rotating at 1.4 m/sec., EFM signals of 3T and 11T were recorded by means of a laser beam of wavelength 780 nm. The laser power was varied in the range of 4 mW and 9 mW. The recorded signals were reproduced by the use of the laser beam having a laser power of 0.5 mW. The modulation factors of the 3T and 11T signals were measured under the optimum power.

(2) Light-Reflection

The light-reflections of the pregroove (non-recorded area) were also measured under the optimum power when the signals were reproduced.

(3) Light-Resistance

The recording medium was exposed to light from Xe lamp (140,000 lux) for 18 hours or for 36 hours. Thereafter, the modulation factors and pregroove light-reflections were measured in the same manner described above. At the same time, the color of the recording medium was observed by sight to classify the degree of fading into the following ranks: AA: not faded, BB: slightly faded but acceptable, and CC: completely faded.

The results are set forth in the following Table 2.

TABLE 2

| Oxonol Compound | Recording and Reproducing Characteristics | | | |
|---|---|---|---|---|
| | 3T Mod. | 11T Mod. | Reflection | Fading |
| (Example 1) Compound No. 1 | | | | |
| (none) | 0.402 | 0.701 | 72% | — |
| (18 hrs) | 0.215 | 0.508 | 89% | BB |
| (36 hrs) | — | — | — | CC |
| (Example 2) Compound No. 3 | | | | |
| (none) | 0.432 | 0.752 | 72% | — |
| (18 hrs) | 0.253 | 0.520 | 88% | BB |
| (36 hrs) | — | — | — | CC |
| (Example 3) Compound No. 5 | | | | |
| (none) | 0.423 | 0.753 | 68% | — |
| (18 hrs) | 0.419 | 0.752 | 68% | AA |
| (36 hrs) | 0.405 | 0.702 | 71% | AA |
| (Example 4) Compound No. 6 | | | | |
| (none) | 0.502 | 0.782 | 69% | — |
| (18 hrs) | 0.495 | 0.752 | 69% | AA |
| (36 hrs) | 0.295 | 0.552 | 76% | BB |
| (Example 5) Compound No. 7 | | | | |
| (none) | 0.498 | 0.778 | 69% | — |
| (18 hrs) | 0.485 | 0.723 | 70% | AA |
| (36 hrs) | 0.263 | 0.532 | 79% | BB |
| (Example 6) Compound No. 8 | | | | |
| (none) | 0.572 | 0.823 | 67% | — |
| (18 hrs) | 0.572 | 0.823 | 67% | AA |
| (36 hrs) | 0.571 | 0.821 | 67% | AA |
| (Example 7) Compound No. 9 | | | | |
| (none) | 0.512 | 0.767 | 68% | — |
| (18 hrs) | 0.511 | 0.766 | 68% | AA |
| (36 hrs) | 0.510 | 0.765 | 68% | AA |
| (Example 8) Compound No. 28 | | | | |
| (none) | 0.502 | 0.792 | 69% | — |
| (18 hrs) | 0.502 | 0.791 | 69% | AA |
| (36 hrs) | 0.501 | 0.790 | 69% | AA |
| (Example 9) Compound No. 45 | | | | |
| (none) | 0.552 | 0.803 | 69% | — |
| (18 hrs) | 0.552 | 0.803 | 69% | AA |
| (36 hrs) | 0.551 | 0.802 | 69% | AA |
| (Example 10) Compound No. 46 | | | | |
| (none) | 0.531 | 0.782 | 68% | — |
| (18 hrs) | 0.530 | 0.782 | 68% | AA |
| (36 hrs) | 0.528 | 0.781 | 69% | AA |
| (Example 11) Compound No. 67 | | | | |
| (none) | 0.522 | 0.773 | 68% | — |
| (18 hrs) | 0.520 | 0.772 | 69% | AA |
| (36 hrs) | 0.519 | 0.770 | 69% | AA |
| (Example 12) Compound No. 71 | | | | |
| (none) | 0.532 | 0.789 | 68% | — |
| (18 hrs) | 0.531 | 0.788 | 68% | AA |
| (36 hrs) | 0.529 | 0.785 | 69% | AA |
| (Example 13) | | | | |

TABLE 2-continued

| Oxonol Compound | Recording and Reproducing Characteristics | | | |
|---|---|---|---|---|
| | 3T Mod. | 11T Mod. | Reflection | Fading |
| Compound No. 86 | | | | |
| (none) | 0.547 | 0.798 | 69% | — |
| (18 hrs) | 0.546 | 0.797 | 69% | AA |
| (36 hrs) | 0.545 | 0.795 | 70% | AA |
| (Example 14) Compound No. 89 | | | | |
| (none) | 0.562 | 0.813 | 70% | — |
| (18 hrs) | 0.562 | 0.812 | 70% | AA |
| (36 hrs) | 0.560 | 0.811 | 71% | AA |
| (Example 15) Compoun.d No. 98 | | | | |
| (none) | 0.513 | 0.777 | 67% | — |
| (18 hrs) | 0.502 | 0.722 | 69% | AA |
| (36 hrs) | 0.415 | 0.542 | 73% | AA |
| (Example 16) Compound. No. 99 | | | | |
| (none) | 0.502 | 0.745 | 70% | — |
| (18 hrs) | 0.266 | 0.540 | 87% | BB |
| (36 hrs) | — | — | — | CC |
| (Example 17) Compound No. 100 | | | | |
| (none) | 0.522 | 0.767 | 70% | — |
| (18 hrs) | 0.519 | 0.765 | 71% | AA |
| (36 hrs) | 0.516 | 0.763 | 73% | AA |
| (Example 18) Compound No. 102 | | | | |
| (none) | 0.512 | 0.753 | 72% | — |
| (18 hrs) | 0.507 | 0.750 | 73% | AA |
| (36 hrs) | 0.505 | 0.745 | 74% | AA |
| (Example 19) Compound No. 106 | | | | |
| (none) | 0.425 | 0.750 | 67% | — |
| (18 hrs) | 0.420 | 0.749 | 67% | AA |
| (36 hrs) | 0.407 | 0.700 | 70% | AA |
| (Example 20) Compound No. 107 | | | | |
| (none) | 0.530 | 0.786 | 68% | — |
| (18 hrs) | 0.529 | 0.785 | 68% | AA |
| (36 hrs) | 0.526 | 0.781 | 69% | AA |
| (Example 21) Compound No. 109 | | | | |
| (none) | 0.498 | 0.779 | 68% | — |
| (18 hrs) | 0.497 | 0.778 | 68% | AA |
| (36 hrs) | 0.495 | 0.777 | 69% | AA |
| (Example 22) Compound No. 112 | | | | |
| (none) | 0.512 | 0.767 | 70% | — |
| (18 hrs) | 0.511 | 0.765 | 70% | AA |
| (36 hrs) | 0.507 | 0.761 | 72% | AA |
| (Example 23) Compound No. 115 | | | | |
| (none) | 0.502 | 0.743 | 70% | — |
| (18 hrs) | 0.502 | 0.722 | 71% | AA |
| (36 hrs) | 0.497 | 0.719 | 72% | AA |
| (Example 24) Compound No. 116 | | | | |
| (none) | 0.518 | 0.773 | 67% | — |
| (18 hrs) | 0.517 | 0.772 | 67% | AA |
| (36 hrs) | 0.516 | 0.771 | 69% | AA |
| (Example 25) Compound No. 117 | | | | |
| (none) | 0.513 | 0.777 | 67% | — |
| (18 hrs) | 0.512 | 0.776 | 67% | AA |
| (36 hrs) | 0.510 | 0.774 | 68% | AA |
| (Example 26) Compound No. 119 | | | | |
| (none) | 0.470 | 0.763 | 69% | — |
| (18 hrs) | 0.469 | 0.762 | 69% | AA |
| (36 hrs) | 0.465 | 0.759 | 71% | AA |
| (Comparison Example 1) Compound A | | | | |
| (none) | 0.562 | 0.812 | 70% | — |
| (18 hrs) | — | — | — | CC |
| (36 hrs) | — | — | — | CC |
| (Comparison Example 2) Compound B | | | | |
| (none) | 0.395 | 0.698 | 66% | — |
| (18 hrs) | — | — | — | CC |
| (36 hrs) | — | — | — | CC |
| (Comparison Example 3) Compound C | | | | |
| (none) | 0.265 | 0.552 | 65% | — |
| (18 hrs) | — | — | — | CC |
| (36 hrs) | — | — | — | CC |
| (Comparison Example 4) Compound D | | | | |
| (none) | 0.355 | 0.652 | 65% | — |
| (18 hrs) | — | — | — | CC |
| (36 hrs) | — | — | — | CC |
| (Comparison Example 5) Compound E | | | | |
| (none) | 0.402 | 0.708 | 67% | — |
| (18 hrs) | — | — | — | CC |
| (36 hrs) | — | — | — | CC |

Remarks: (none) means the data before exposure to Xe lamp, and (18 hrs) and (36 hrs) mean the data after 18 hours exposure and 36 hours exposure, respectively. "—" means that the tracking failed.

From the data set forth in Table 2, it is clear that each of the samples (Examples 1–18) of the invention (the information recording medium having the recording layer containing oxonol compound comprising a quaternary ammonium ion) gives relatively stable modulation factors even after exposure to light from Xe lamp, and therefore they have high light-resistance, as compared with the samples for comparison having the recording layer containing cyanine dye (Comparison Example 1), or oxonol compound comprising tertiary ammonium salt (Comparison Examples 2, 3 and 5) or ammonium salt (Comparison Example 4). In particular, the samples having the recording layer containing oxonol compound comprising divalent cation part (Examples 3–15, Examples 17–18) exhibit remarkably improved light-resistance.

What is claimed is:

1. An information recording medium comprising a support and a recording layer provided thereon on which information can be recorded by means of a laser beam; wherein said recording layer contains a dye compound having the following formula (IV-2):

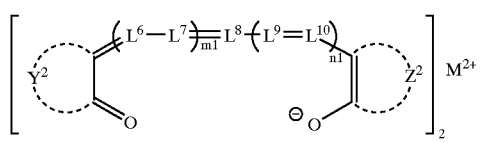

(IV-2)

in which each of $Y^2$ and $Z^2$ is independently selected from one of A-6, A-7, and A-12:

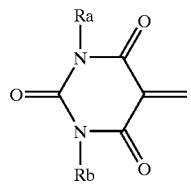

A-6

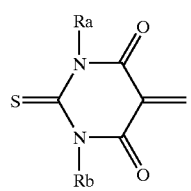

A-7

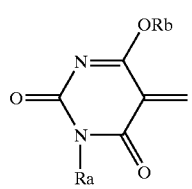

A-12 in which each of Ra and Rb independently represents a hydrogen atom or a substituent group selected from the substituent groups consisting of a linear, branched or cyclic alkyl group having 1 to 18 carbon atoms, an alkenyl group having 2 to 18 carbon atoms, an alkynyl group having 2 to 18 carbon atoms, an aryl group having 6 to 18 carbon atoms, an aralkyl group having 7 to 18 carbon atoms, an acyl group having 2 to 18 carbon atoms, an alkylsulfonyl group having 1 to 18 carbon atoms, an arylsulfonyl group having 6 to 18 carbon atoms, an alkylsulfinyl group having 1 to 18 carbon atoms, an alkoxycarbonyl group having 2 to 18 carbon atoms, an aryloxycarbonyl group having 7 to 18 carbon atoms, an alkoxy group having 1 to 18 carbon atoms, an aryloxy group having 6 to 18 carbon atoms, an alkylthio group having 1 to 18 carbon atoms, an arylthio group having 6 to 10 carbon atoms, an acyloxy group having 2 to 18 carbon atoms, a sulfonyloxy group, a carbamoyloxy group, an amino group, a carbamoyl group, a sulfamoyl group, a halogen atom, a hydroxyl group, a nitro group, a cyano group, a carboxyl group, and a 4- to 7-membered heterocyclic group, wherein these groups may be substituted with at least one group selected from the above-mentioned substituent groups;

each of $L^6$, $L^7$, $L^8$, $L^9$ and $L^{10}$ independently represents a methane group which may have one or two substituent groups selected from the substituent groups described for Ra and Rb of A-6, A-7, and A-12;

$M^{2+}$ represents an onium ion having the following formula (V) or (VI):

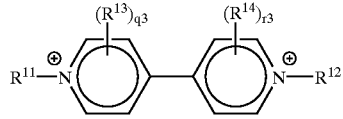

(V)

in which each of $R^{11}$ and $R^{12}$ independently represents a group selected from the substituent groups consisting of an alkyl group having 1 to 18 carbon atoms, an alkenyl group having 2 to 18 carbon atoms, an alkynyl group having 2 to 18 carbon atoms, and an aryl group having 6 to 18 carbon atoms, wherein the alkyl, alkenyl, alkynyl and aryl groups may be substituted with one or more groups selected from the substituent groups described for Ra and Rb of A-6, A-7, and A-12; each of $R^{13}$ and $R^{14}$ independently represents a group selected from the substituent groups described above for Ra and Rb of A-6, A-7, and A-12; or each set of $R^{11}$ and $R^{13}$, $R^{12}$ and $R^{14}$, or $R^{13}$ and $R^{14}$ can be combined to form a 4- to 7-membered ring; each of q3 and r3 independently is an integer of 0 to 4; or

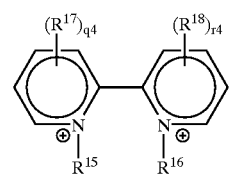

(VI)

in which each of $R^{15}$ and $R^{16}$ independently represents a group selected from the substituent groups consisting of an alkyl group having 1 to 18 carbon atoms, an alkenyl group having 2 to 18 carbon atoms, an alkynyl group having 2 to 18 carbon atoms, and an aryl group having 6 to 18 carbon atoms, wherein the alkyl, alkenyl, alkynyl and aryl groups may be substituted with one or more groups selected from the substituent groups described for Ra and Rb of A-6, A-7, and A-12; each of $R^{17}$ and $R^{18}$ independently represents a group selected from the substituent groups described for Ra and Rb of A-6, A-7, and A-12; or each set of $R^{15}$ and $R^{16}$, $R^{15}$ and $R^{17}$, $R^{16}$ and $R^{18}$, or $R^{17}$ and $R^{18}$ can be combined to form a 4- to 7-membered ring; each of q4 and r4 independently is an integer of 0 to 4; and each of m1 and n1 independently represents an integer of 0, 1 or 2.

2. The information recording medium of claim 1, wherein a light-reflecting layer of metal or submetal is provided on the recording layer.

3. The information recording medium of claim 1, wherein each of m1 and n1 is 1; m1 is 0 while n1 is 2; or m1 is 2 while n1 is 0.

* * * * *